INVENTORS:
TOM KILBURN
DAVID B. G. EDWARDS
GORDON E. THOMAS

June 14, 1960 T. KILBURN ET AL 2,940,670

ELECTRONIC DIGITAL COMPUTING MACHINES

Filed April 2, 1956

16 Sheets-Sheet 2

INVENTORS:
TOM KILBURN
DAVID B. G. EDWARDS
GORDON E. THOMAS

June 14, 1960 T. KILBURN ET AL 2,940,670

ELECTRONIC DIGITAL COMPUTING MACHINES

Filed April 2, 1956

16 Sheets-Sheet 3

INVENTORS:
TOM KILBURN
DAVID B. G. EDWARDS
GORDON E. THOMAS

By: Stevens, Davis, Miller & Mosher

Attorneys

INVENTORS:
TOM KILBURN
DAVID B. G. EDWARDS
GORDON E. THOMAS
By: Stevens, Davis, Miller & Mosher
Attorneys June 14, 1960 T. KILBURN ET AL 2,940,670

ELECTRONIC DIGITAL COMPUTING MACHINES

Filed April 2, 1956 16 Sheets-Sheet 5

INVENTORS:
TOM KILBURN
DAVID B. G. EDWARDS
GORDON E. THOMAS

By
Stevens, Davis, Miller & Mosher
Attorneys

INVENTORS:
GORDON E. THOMAS, TOM KILBURN
and DAVID B. G. EDWARDS

INVENTORS:
TOM KILBURN
DAVID B. G. EDWARDS
GORDON E. THOMAS
By Stevens, Davis, Miller & Mosher
Attorneys

ELECTRONIC DIGITAL COMPUTING MACHINES

INVENTORS:
TOM KILBURN
DAVID B. G. EDWARDS
GORDON E. THOMAS
By Stevens, Davis, Miller & Mosher

INVENTORS:
TOM KILBURN
DAVID B. G. EDWARDS
GORDON E. THOMAS

By Stevens, Davis, Miller & Mosher
Attorneys

INVENTORS:
TOM KILBURN
DAVID B. G. EDWARDS
GORDON E. THOMAS
By
Stevens, Davis, Miller & Mosher
Attorneys INVENTORS:
TOM KILBURN
DAVID B. G. EDWARDS
GORDON E. THOMAS
By
Stevens, Davis, Miller & Mosher INVENTORS:
TOM KILBURN
DAVID B. G. EDWARDS
GORDON E. THOMAS
By Stevens, Davis, Miller & Mosher
Attorneys

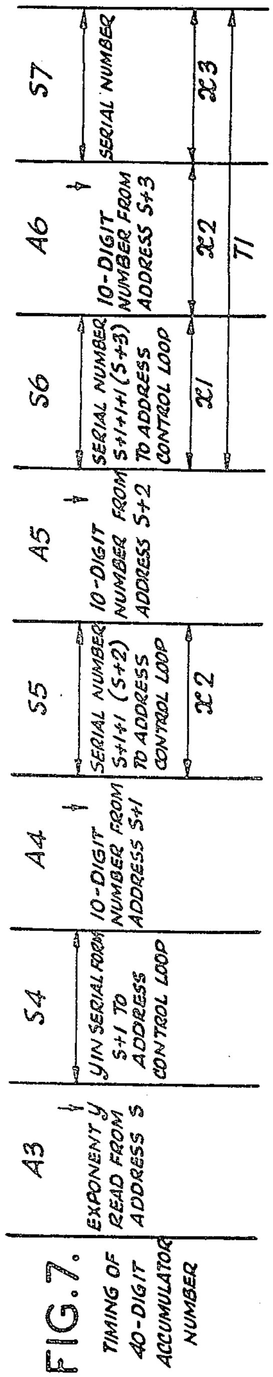
FIG. 7. TIMING OF 40-DIGIT ACCUMULATOR NUMBER
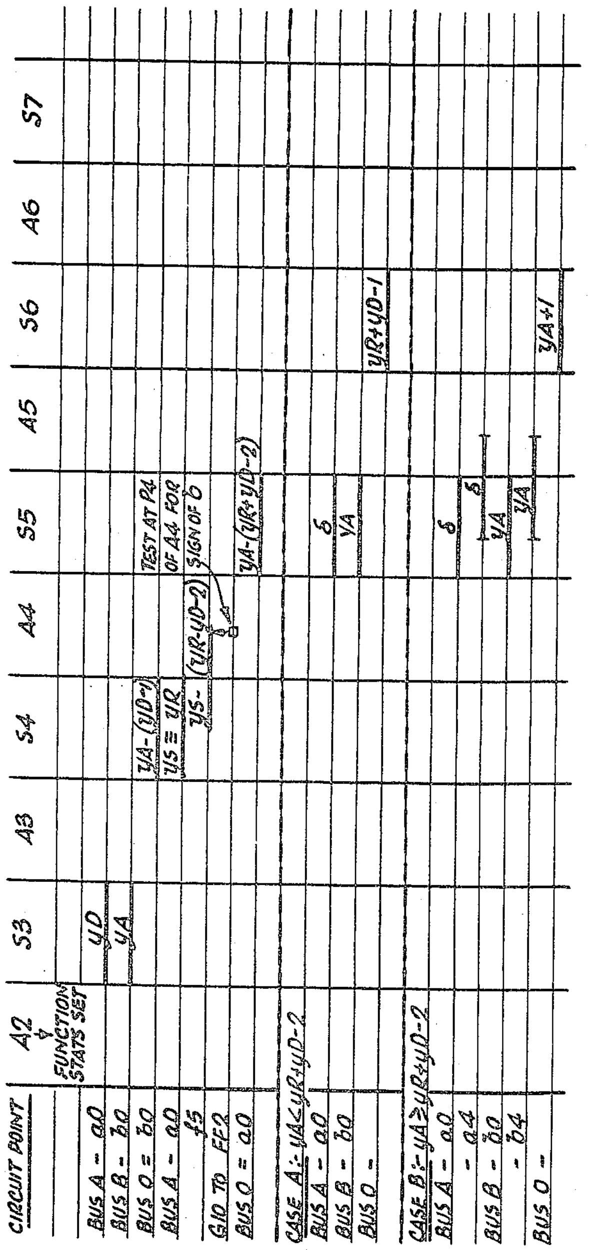
FIG. 8. TIMING OF INITIAL EXPONENT ARITHMETIC
INVENTORS:
TOM KILBURN
DAVID B. G. EDWARDS
GORDON E. THOMAS
By
Stevens, Davis, Miller & Mosher
Attorneys INVENTORS:
TOM KILBURN
DAVID B. G. EDWARDS
GORDON E. THOMAS
By
Stevens, Davis, Miller & Mosher
Attorneys

INVENTORS:
TOM KILBURN
DAVID B. G. EDWARDS
GORDON E. THOMAS

By Stevens, Davis, Miller & Mosher
Attorneys

United States Patent Office 2,940,670

Patented June 14, 1960

2,940,670

ELECTRONIC DIGITAL COMPUTING MACHINES

Tom Kilburn, Manchester, England, and David Beverley George Edwards, Pontypridd, and Gordon Eric Thomas, Port Talbot, Wales, assignors, by mesne assignment, to International Business Machines Corporation, New York, N.Y., a corporation of New York Filed Apr. 2, 1956, Ser. No. 575,637

Claims priority, application Great Britain Apr. 7, 1955

14 Claims. (Cl. 235—166)

This invention relates to electronic digital computing machines and is more particularly concerned with an arrangement, in particular an accumulator construction, which is capable of effecting computing operations with a "floating" radix point.

One object of the invention is to provide a machine arrangement which is both economical in the requirements of electronic apparatus and fast in operation.

In the following specification reference is made to a number of related copending applications as follows:

Serial No. 416,674, filed March 16, 1954 by F. C. Williams et al. which will hereinafter, for brevity, be called reference A.

Serial No. 414,814, filed March 8, 1954 by F. C. Williams et al., now Patent No. 2,813,255, hereinafter called reference B.

Serial No. 226,761, filed May 17, 1951, by F. C. Williams et al., now Patent No. 2,840,304, hereinafter called reference C.

Serial No. 422,886, filed April 13, 1954 by T. Kilburn, now Patent No. 2,856,126, hereinafter called reference D.

Broadly, the machine according to the invention is arranged to operate with number-representing signals each of which consist of two separate portions, an exponent-representing portion and a number-representing portion, and is provided with means for effecting an initial subtraction operation with the exponent-representing portions of two separate number-representing signals which are to be the subject of an arithmetical operation and for deriving therefrom a signal which is representative of the difference in exponent value between the two numbers, such derived exponent-difference signal being then used to control the setting of a variable signal-position-shift device and at the same time to provide a sign-representing signal which is representative of which of the two exponent-representing portions is the greater, such derived sign-representing signal being then used to control the respective routings of the number-representing signal portions of the two numbers which are to be subjected to the mathematical operation of a computing circuit by way of separate paths or channels, one of which paths or channels includes the aforesaid variable signal position shift device whereby the two number-representing signal portions are presented to said computing circuit with correct place registration as regards the radix point thereof.

In a particular application of the invention to a machine operating, at least so far as the computing circuits are concerned, with numbers represented in serial form as electric pulse signal trains, the aforesaid variable signal position shift device may be constituted by a variable delay device, conveniently in the form of a multi-section electric delay line whose respective sections may be rendered operative or inoperative in any required combination to impose a predetermined value of time delay under the control of said exponent-difference signal.

The machine may further be provided with arrangements by which the larger of the two exponent-representing portions is registered as the exponent-representing portion of the eventual answer number and is preferably further provided with means for examining and standardising the number-representing portion of the answer signal obtained from the computing circuit and with means by which the previously registered exponent-representing portion of the answer is suitably re-adjusted in value in accordance with any change of significance of the number-representing portion of the answer signal effected during such standardisation operation.

In order that the above and other features of the invention may be more readily understood one embodiment thereof will now be described with reference to the accompanying drawings, in which:

Figs. 1*a*, 1*b*, 1*c*, 1*d*, 1*e*, 1*f* and 1*g* form, in combination, a block schematic diagram of the principal elements of a machine embodying the invention.

Figs. 2*a*, 2*b* and 3 each comprise a series of diagrams illustrating a number of electric waveforms which are available in the machine for controlling its operation.

Figs. 4*a*, 4*b* are diagrams illustrating the form of the so-called "Z counter" arrangements.

Fig. 5 is a more detailed circuit diagram of the composite computing unit CMU.

Figs. 6*a*, 6*b* and 6*c* are diagrams illustrating the form of the variable electric delay line device VDC.

Figs. 7–13 are a series of timing diagrams for illustrating the cycle of operations under a number of different operating conditions.

*Outline—Machine arrangement*

Figure 1A:
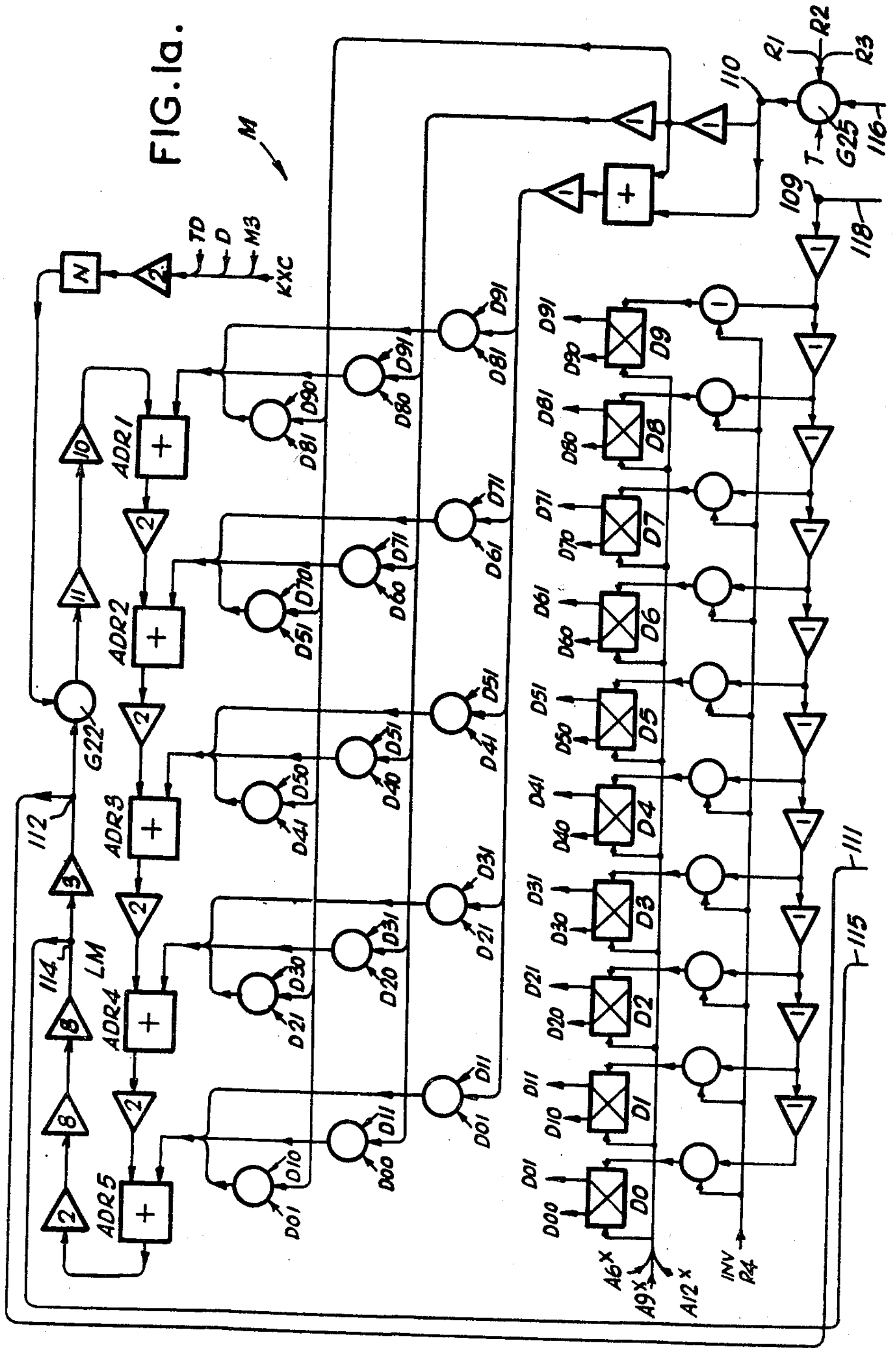

The binary machine arrangements illustrated are designed to operate with ten-digit number and order words, while the data storage is effected in the parallel mode, the rest of the machine, including the accumulator employs serial-form word signals having a signalling speed of 1 microsecond per digit and in which the presence of a negative-going pulse for the first 9/10 of each 1 microsecond digit interval is indicative of binary value "1" and the absence of such a pulse is indicative of binary value "0."

The machine, of which the data storage and control arrangements resemble those of reference A, operates with a regular unbroken rhythm of alternating scan (store-regeneration) and action beats (minor cycles) and the commencement of each operative bar (major cycle) period involved in the obeying of any chosen order is marked by the release of a prepulse signal, the consecutive beats after such prepulse signal being identified as S1, A1, S2, A2, S3, A3, S4 and so on until the completion of the bar.

The main data storage of the machine is effected in parallel form on a number of cathode ray tube devices, one for each of the ten separate digits of the basic word length, the parallel outputs from such cathode ray tube store being serialised for use in serial form in the remainder of the machine including the computing and other circuits to be described and the serial form input signals to such store being correspondingly converted into parallel form prior to their being written into the main data storage.

The instructions or orders of the machine comprise two separate and sequential ten-binary digit words of which the first specifies the desired order function according to the table of orders given subsequently and, by means of included *b* digits, any desired modification of the required data store address, which is specified in the second ten-binary digit word, may be made. Although these orders operate control means analogous to those of other machines, particularly that described in reference A through the usual staticisor and decoding arrangements, the present machine is provided with separate and subsidiary control means for certain long orders such as those involving "floating point" operation, copying and multiplication. This facilitates decoding and allows a longer period of overlap of one of such long orders with the next following order.

The numbers employed in the computing section of the machine are specified in "floating binary" form, i.e. $x2^y$, where $x$ is a 30-digit number (three seperate ten-digit words) and $y$ is a 10-digit exponent (one ten-digit word). The 30 digit number $x$ is regarded as a fraction and the last, i.e. most significant, digit is used as a sign digit, "0" indicating a positive number and "1" a negative number. As the value of such sign digit is accordingly $-\frac{1}{2}$, the value of the number $x$ accordingly lies within the range $-\frac{1}{2} \leqslant x < +\frac{1}{2}$. As described later, use is made of a "standard" form of number in which $x$ lies within one or other of the following ranges:

| | |
|---|---|
| Positive numbers | $+\frac{1}{2} > x \geqslant +\frac{1}{4}$ |
| Negative numbers | $-\frac{1}{4} > x \geqslant -\frac{1}{2}$ |

A characteristic of a number of such standard form is that it always exhibits a change-over in the value of the digits occupying the most significant and next-to-most significant digit positions. Thus, in the case of a positive number, the form will always be 01 . . . and in the case of a negative number the form will always be 10. . . .

The exponent $y$ represents a whole number and is also signed, the last or most significant digit again specifying by its respective values "0" or "1" the sign values of positive or negative respectively. For convenience of the initial arithmetic operations with the exponent-representing words of the number signals concerned, use is not made of the next-to-last, i.e. the ninth digit of the exponent word, in order to permit such ninth digit position to act as a "spill" digit position for accommodating any carry digit that may be propagated during the exponent arithmetic. This prevents any such carry digit from interfering with the form of the last or sign digit as might otherwise occur.

The first nine digits of the exponent $y$ represent respectively the binary values $2^0, 2^1, 2^2 \ldots 2^7, 2^8$ and the tenth digit the binary value $-2^8$. The effective range of the $y$ number is accordingly from a maximum negative value of 1000000000 (−256) to the maximum positive value of 0100000000 (+256). Bearing in mind that the maximum value of the $x$ number is just less than $2^{-1}$ and that the minimum value is $2^{-30}$ the complete number signal X (ie. $x2^y$) can express any value within the range of $2^{255} > X \geqslant 2^{-286}$.

*Definition of drawing symbols*

In the accompanying drawings certain elements are shown symbolically for the sake of simplicity and clarity of drawing.

Figure 1B:
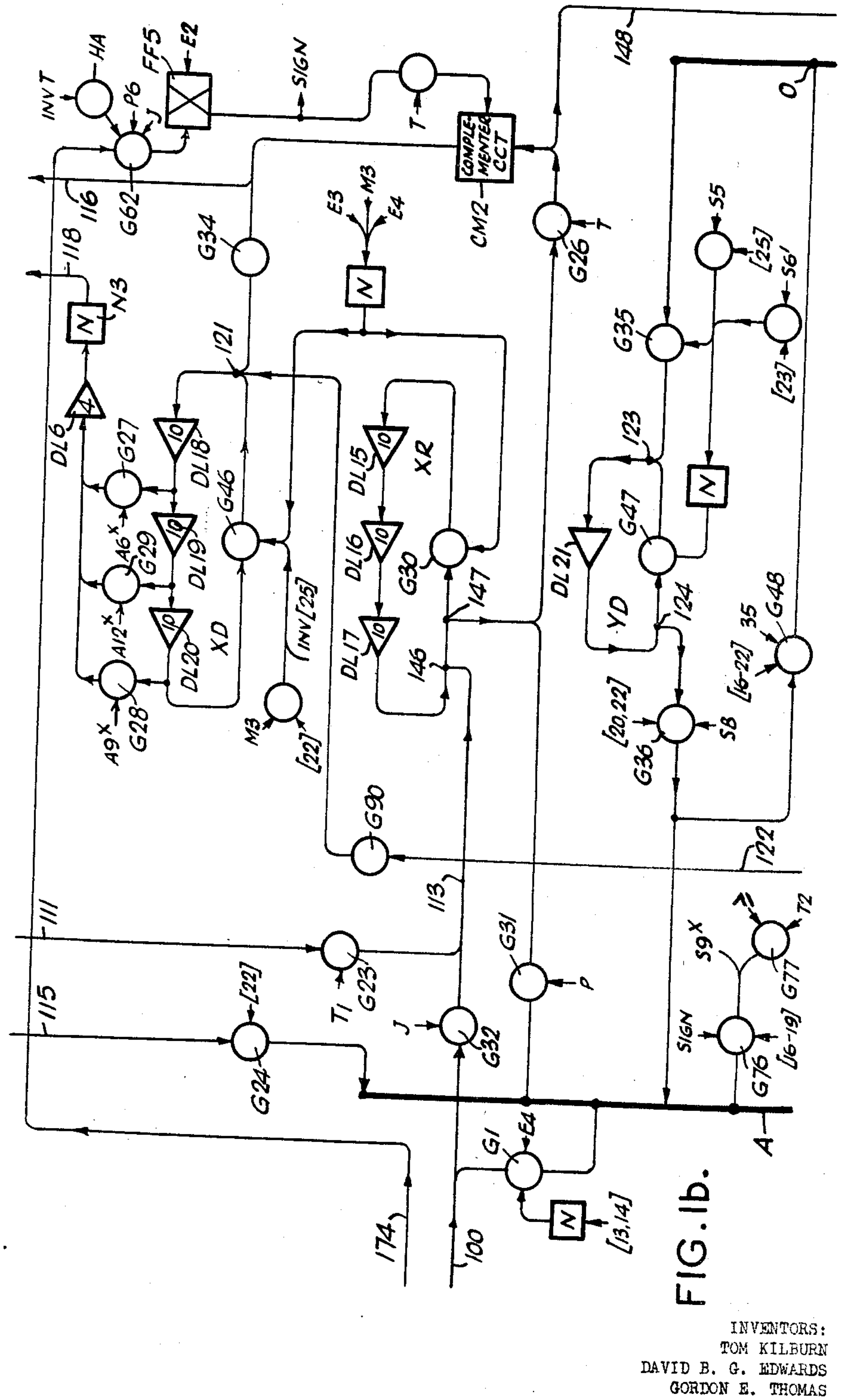

The symbol such as that shown at G1 in Fig. 1*b*, denotes a coincident or "AND" gate which is normally closed or blocked but which is opened to provide a signal output on its output lead when, and only when, each of the various inputs indicated by the attached connections or legends is supplied with a signal of active, i.e. negative-going, polarity. Examples of such AND gates are well known in the art—see, for example, the description by Page in "Electronics," September 1948, page 110.

The symbol such as that shown at DL21, in Fig. 1*b*, indicates a delay line element with the delay time value, measured in microseconds, indicated by the numeral within the symbol. Such a delay line element is conveniently in the form of an inductive winding having distributed self-capacitance to a common capacitive electrode such as is described, for example, in reference B. Such elements are assumed to include any necessary signal amplifier and pulse reshaping circuits. The latter can be of any suitable form such as that described in detail in reference A.

The symbol such as that shown at FF5 in Fig. 1*b*, indicates a conventional two-stable-state trigger circuit (bi-stable multivibrator) which may be triggered into one state, conventionally called its "on" or "1" state by an applied negative impulse on its left-hand input lead and reset to its opposite state, conventionally called the "off" or "0" state by negative input pulses on its right-hand input lead. Such a circuit, as is well known, may also be arranged to be reversed from any existing state to the opposite state by negative pulses applied to a common reversing lead which is that indicated at the centre point of its uppermost side. Such trigger circuits are capable of providing two anti-phase outputs, that of the left-hand lower lead (or right-hand upper lead) being assumed to be active or negative-going when the circuit is in its "on" state and positive-going or zero value when in its "off" state whereas that of the right-hand output lower lead (or left-hand upper lead) being of anti-phase relationship, i.e. being assumed to be active or negative-going when the trigger circuit is in the "off" state and to be positive-going or of zero value when the trigger circuit is in the "on" state. Such trigger circuits are also well known in the art and one example thereof is to be found in U.H.F. Techniques (published, Chapman and Hall, 1942), page 110.

Figure 1C:
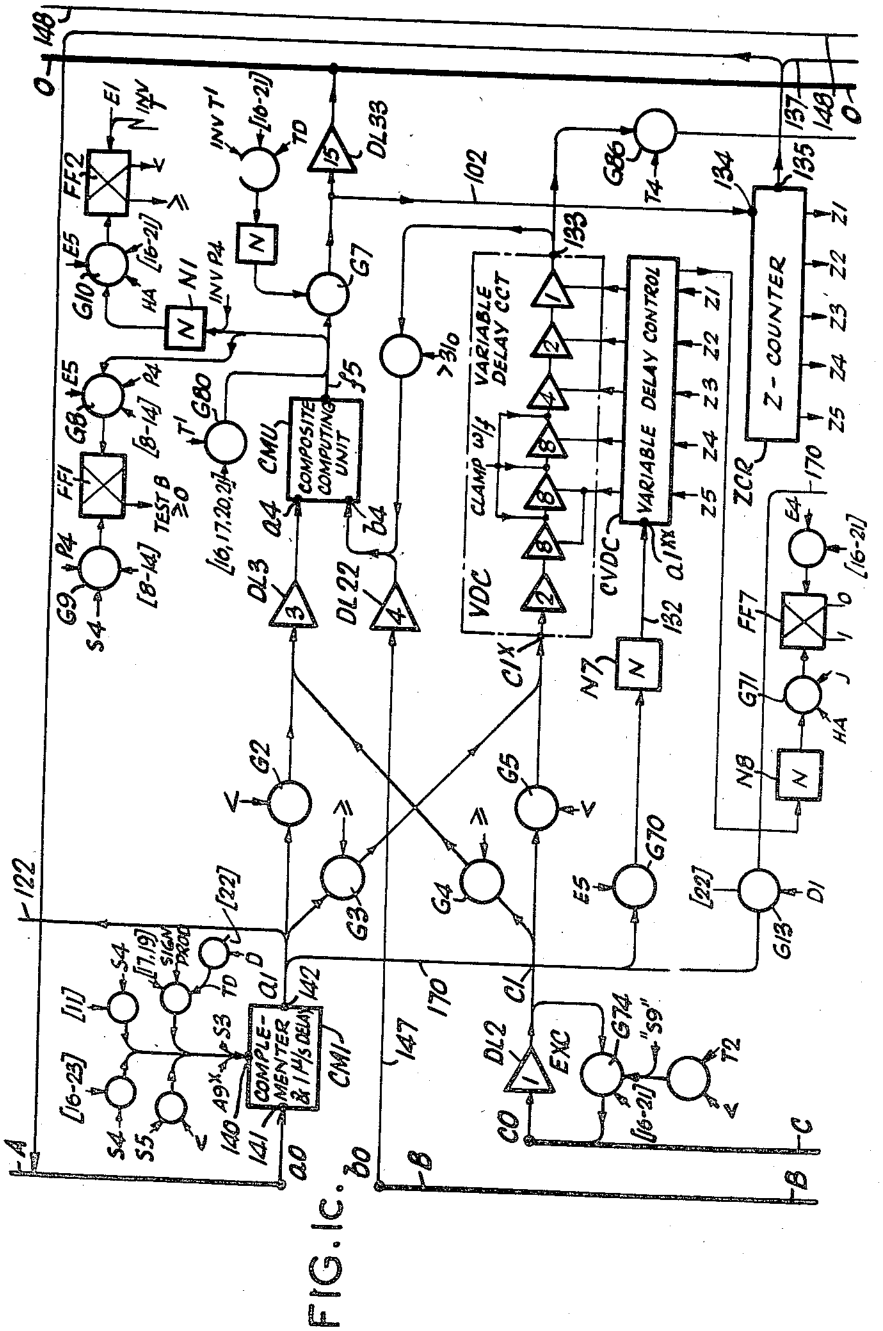

The symbol such as that shown at N1, Fig. 1*c*, indicates a so-called inverter or NOT circuit by which a negative-going or active level output potential is provided in the absence of any such active potential on its input lead and by which a zero or "off" potential is provided in the event of an active or negative-going input potential on the input lead thereto. Such inverter devices are also well known in the art and usually comprise arrangements employing the phase reversing characteristic of a thermionic valve.

The symbol such as that shown in the lead supplying the INV T waveform to reset the trigger circuit FF2, Fig. 1*c*, denotes a differentiating network of standard form whereby a square pulse waveform is converted into sharp pulses at the leading and trailing edges. Generally speaking, as only negative-going pulses are employed actively in the present arrangements, only the negative-going spike is employed and the other positive-going spike may, if desired, be eliminated by suitable unilaterally conductive devices such as a diode.

Figure 1D:
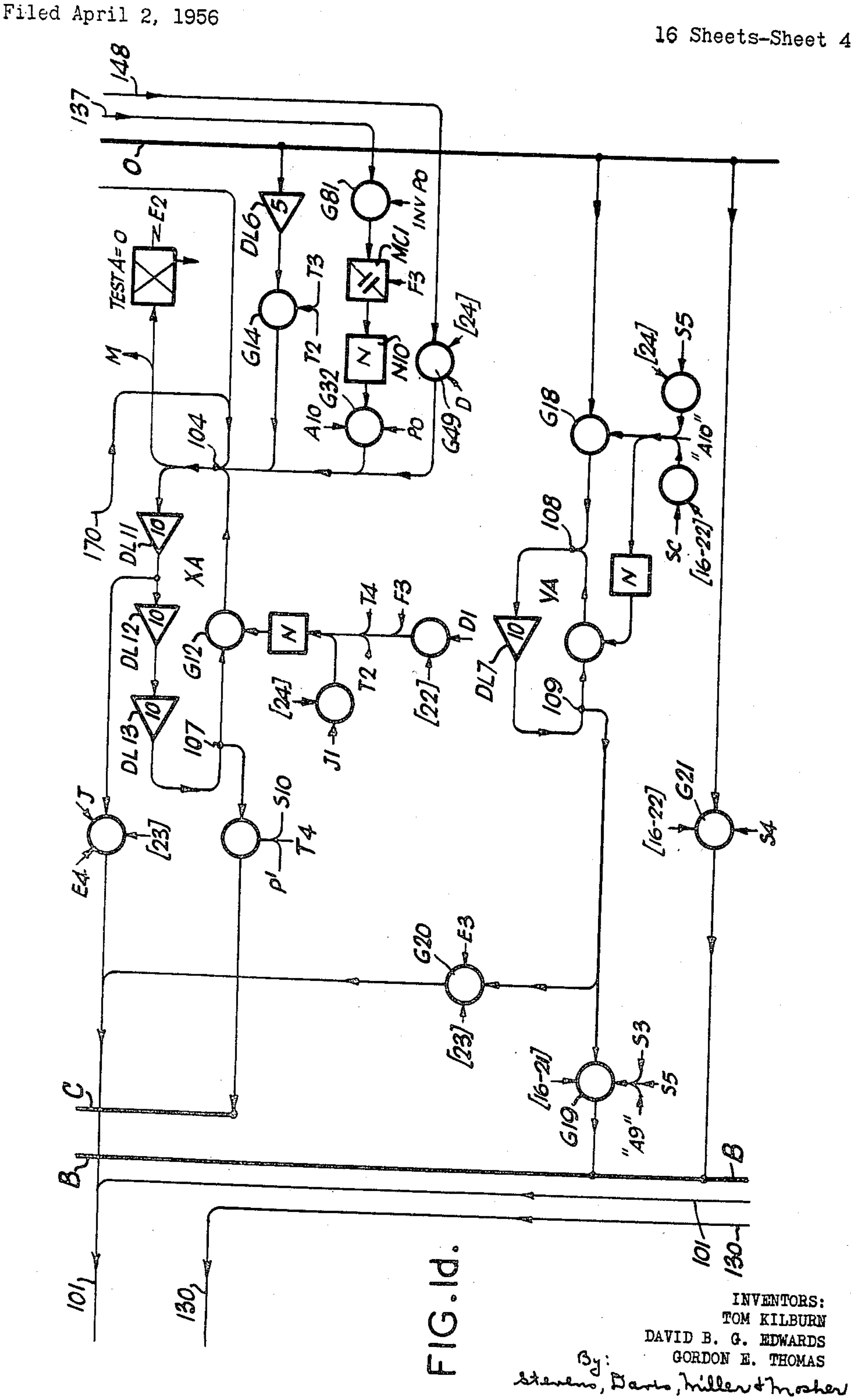
Figure 1E:
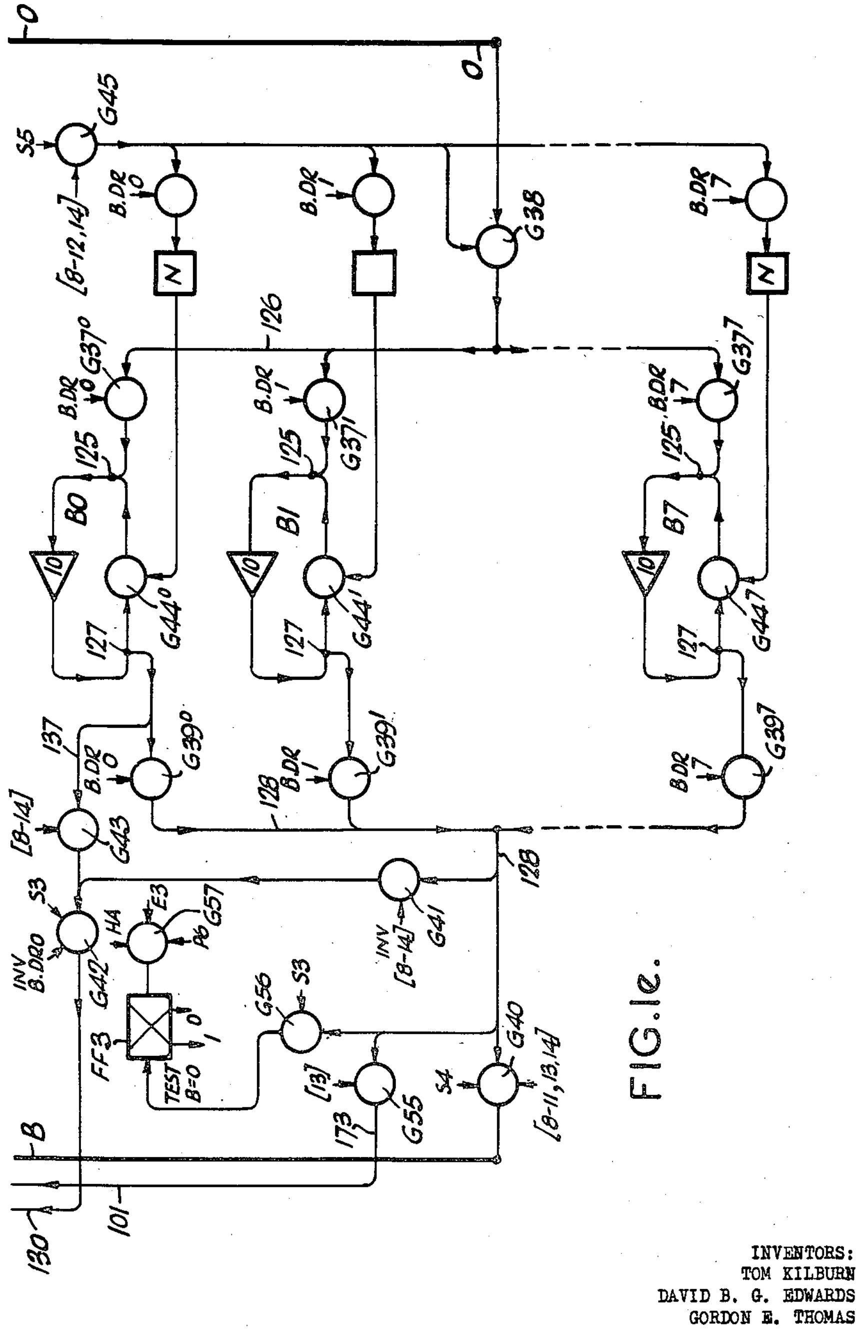
Figure 1F:
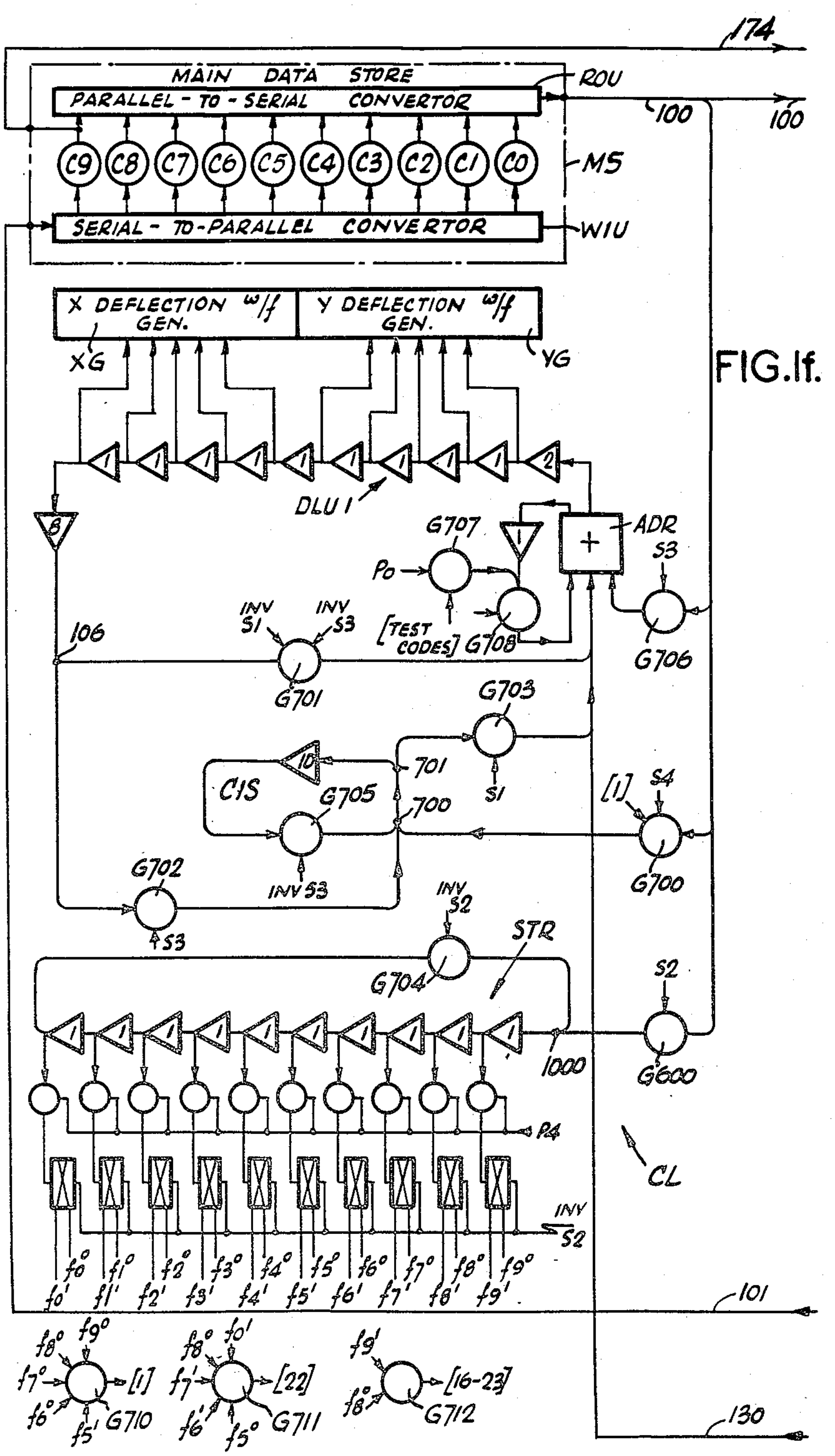

The symbol as shown at ADR5, Fig. 1*a*, or at ADR, Fig. 1*f*, denotes a conventional adder circuit such as is described by F. C. Williams et al. in Proc. I.E.E. 1952, vol. 99, part II, page 107. The symbol, as shown at ADR5, assumes the normal carry-digit delay loop is present and is entirely conventional in form whereas the symbol form shown at ADR in Fig. 1*g*, indicates the aforesaid carry-digit delay loop externally of the block symbol for the purpose of showing the manner of applying an additional input thereto.

The legends attached to the various symbols refer to the relevant waveform or potential applied thereto such as the waveform E4, Fig. 1*b*, applied to one input of the gate circuit G1. The numerals within square brackets on the drawing refer to the specific function code signals (of which a total of 32 are available) and as a result of which a negative control potential is available on that particular lead. Thus, for example, and referring again to gate G1, either of the function code signals for orders 13, 14 will provide a negative input to the inverter N1. In consequence the gate G1 is supplied with an opening potential from the inverter at all times except when order 13 or 14 is operative.

*Order Code*

| | | |
|---|---|---|
| 0 | | |
| 1 | s; C | Send a main store number to control. |
| 2 | test B | If B≥0 then s; C but if B<0 add +1 to control. The B register tested is the one specified in the last B order to be obeyed. |
| 3 | test /δ/ | If /δ/>31, s; C but if /δ/≤31 add +1 to control. /δ/ is the modulus of the exponent difference recorded in the last floating point order obeyed. |
| 4 | h; S | Send a 10-digit word from hand keys to main store. |
| 5 | Sm; T | Record the five most-significant digits of a word in address s of the main store on paper tape. |
| 6 | 2t; S | Send two consecutive characters from tape to main store address s. |
| 7 | t; Sl: 0; Sm | Send a 5-digit character from paper tape to least significant 5-digit position of main store address s and erase contents of the 5 most significant digit positions of same main store address. |
| 8 | bn "and" s; Bn | Addition, subtraction and logical operations carried out between a store number and the specified B register. |
| 9 | bn "or" s; Bn | |
| 10 | bn+s; Bn | |
| 11 | bn−s; Bn | |
| 12 | s; Bn | Direct copy orders involving main store and specified B register. |
| 13 | bn; S | |
| 14 | clear B | |
| 15 | | |
| 16 | a+s; A | Add or subtract store number to or from accumulator number as round-off of answer. |
| 17 | a−s; A | |
| 18 | a+s; A | Add or subtract store number to or from accumulator number without round-off of answer. |
| 19 | a−s; A | |
| 20 | s; R:$X_DX_R$:a+P; A | These two orders initiate multiplication of two 40-digit numbers one from the main store (multiplier R) and the other from multiplicand register. The most significant portion P of resultant product is added or subtracted from the 40-digit accumulator number, the result rounded-off and corrected to a number of standard form. |
| 21 | s; R:$X_DX_R$:a−P; A | |
| 22 | s; R:$X_DX_R$:(m. s); A: (l. s); D | This order carries out a multiplication similar to that specified by orders 20 and 21 but all the digits of the product are retained. The more significant half of the product is recorded in the accumulator register and the least significant half in the multiplicand register. |
| 23 | a; S | Direct copy orders involving the main store and the accumulator. |
| 24 | s; A | |
| 25 | s; D | A copy order from store to multiplicand register. |
| 26 | | |
| 27 | s; T.F | A 10-digit number sent to magnetic staticisor to define track number and function. |
| 28 | s; W | Transfer a 10-digit word between main store and magnetic drum in direction specified by the previous order. The first time this order is obeyed it always reads an address number from the address track of the drum. |

Of the above order numbers 1, 2, 3, 4, 8, 9, 10, 11, 12, 13, 14, 27 and 28 take 60 microseconds (beats S1 . . . A3) to complete; order numbers 16, 17, 18, 19, 23, 24, 25 take 180 microseconds (18 beats, S1 . . .A9) to complete; order number 22 takes 300 microseconds (30 beats, S1 . . . A15) to complete and order numbers 20 and 21 take 360 microseconds (36 beats, S1 . . . A18) to complete.

*Fundamental waveform generators*

Figure 1G:
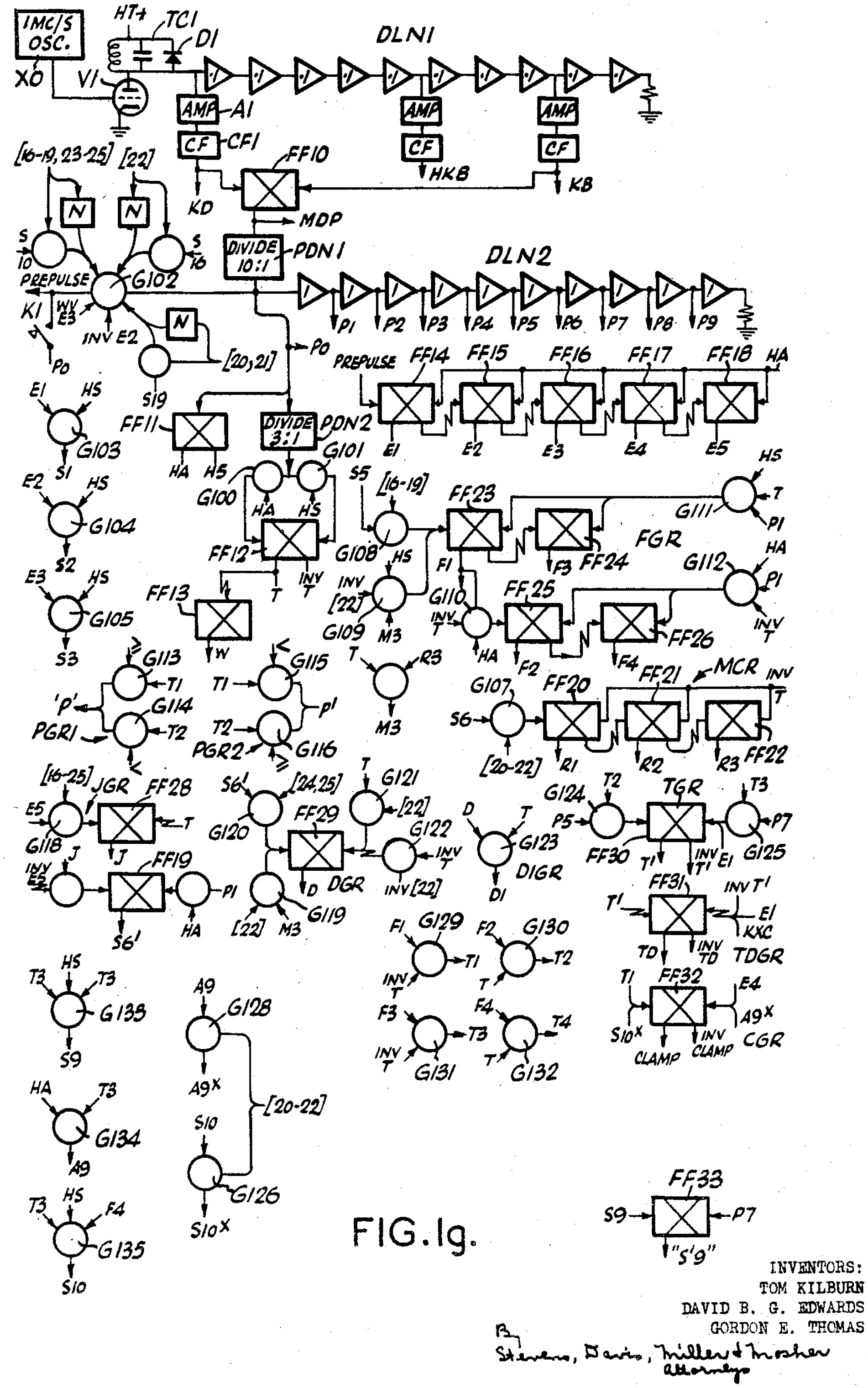

The arrangements for generating the fundamental waveforms for controlling the machine operation are shown in Fig. 1*g* and comprise a 1 mc./s. master crystal oscillator XO providing a 1 microsecond period sine wave to the control grid of valve V1 whose anode circuit includes a resonant circuit TC1 tuned to 5 mc./s. and shunted by diode D1. The negative-going half-cycle of the 5 mc./s. oscillation initiated by each positive swing of the output from oscillator XO is transmitted down a delay line network DLN1 of ten serially connected 0.1 microsecond delay elements. A tapping from the entry end of the network is fed through amplifier A1 and a cathode follower CF1 to provide the KD waveform, Fig. 3, consisting of a sharp 0.1 microsecond positive-going pulse at the beginning of each digit interval. A similar tapping between the fifth and sixth delay elements provides the HKB waveform, Fig. 3, consisting of a sharp 0.1 microsecond positive-going pulse at the mid point of each digit interval while a further tapping between the eighth and ninth delay elements provides the KB pulse waveform, Fig. 3, consisting of a sharp 0.1 microsecond positive-going pulse 0.8 microsecond from the beginning of each digit interval. The KD and KB pulses correspond to the MKD and MKD pulses referred to in reference A.

Figure 6A:
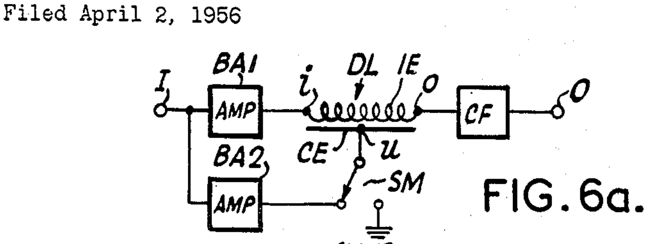
Figures 3, 6B:
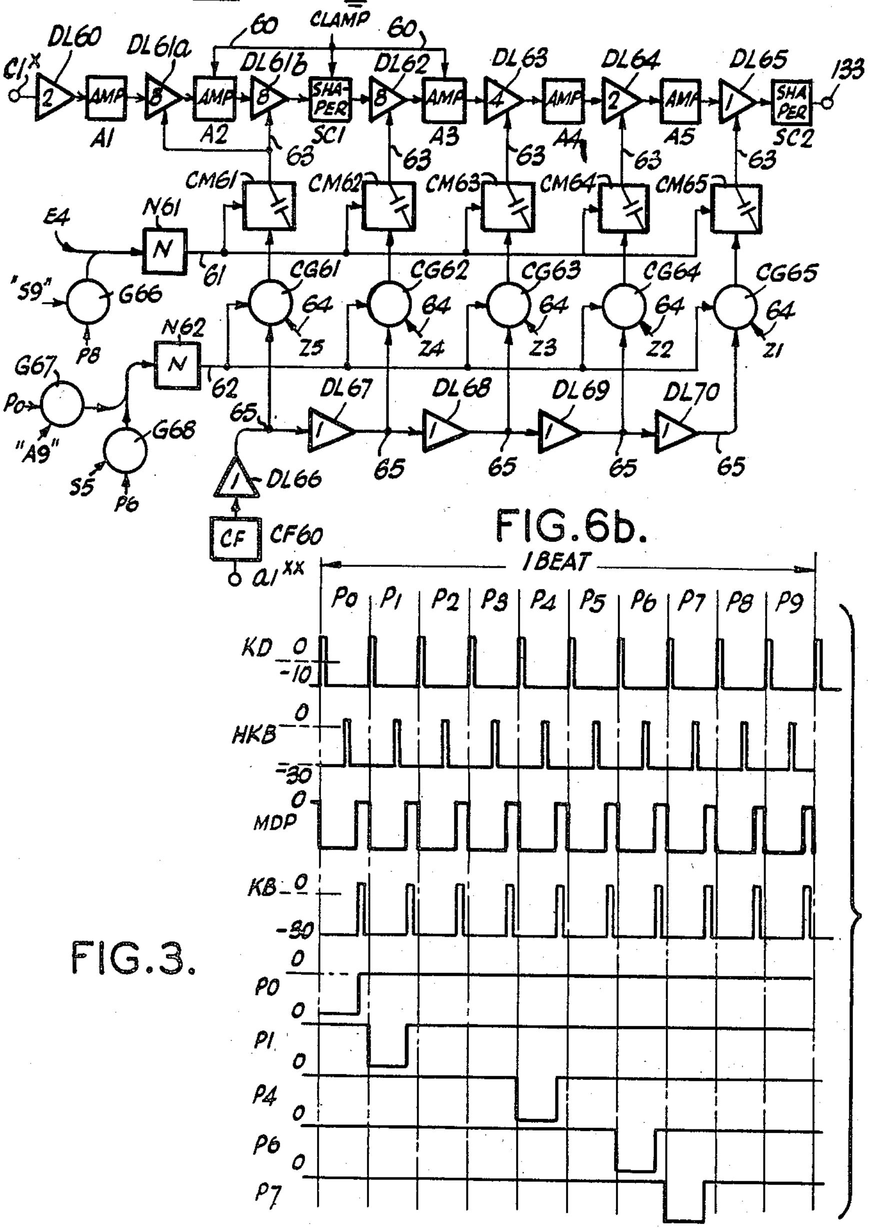

The KD pulses provide a triggering medium and the KB pulses a resetting medium for a trigger circuit FF10 whose output forms the MDP waveform, Fig. 3, and consists of a negative-going pulse during the first 0.8 microsecond of each digit interval. This MDP waveform, which corresponds to the MDP waveform in reference A, is applied to a pulse frequency divider circuit PDN1 having a division ratio of 10:1 and comprising, for instance, one or more divider circuits of the phantastron type as described in British Patent No. 582,758. Such divider circuit provides an output pulse for every tenth input pulse, i.e. at 10 microsecond intervals. This output wave form constitutes the PO waveform defining the first digit interval PO of each 10 microsecond beat period. It is transmitted to a second delay line network DLN2 consisting of ten 1 microsecond delay elements and from the series of tapping points down such line there is derived the group of further waveforms P1, P2, P3 . . . P9 of which P0, P1, P4, P6 and P7 are shown in Fig. 3. These waveforms serve to define, in the usual manner, the remaining digit intervals of each beat period.

Figure 2A:
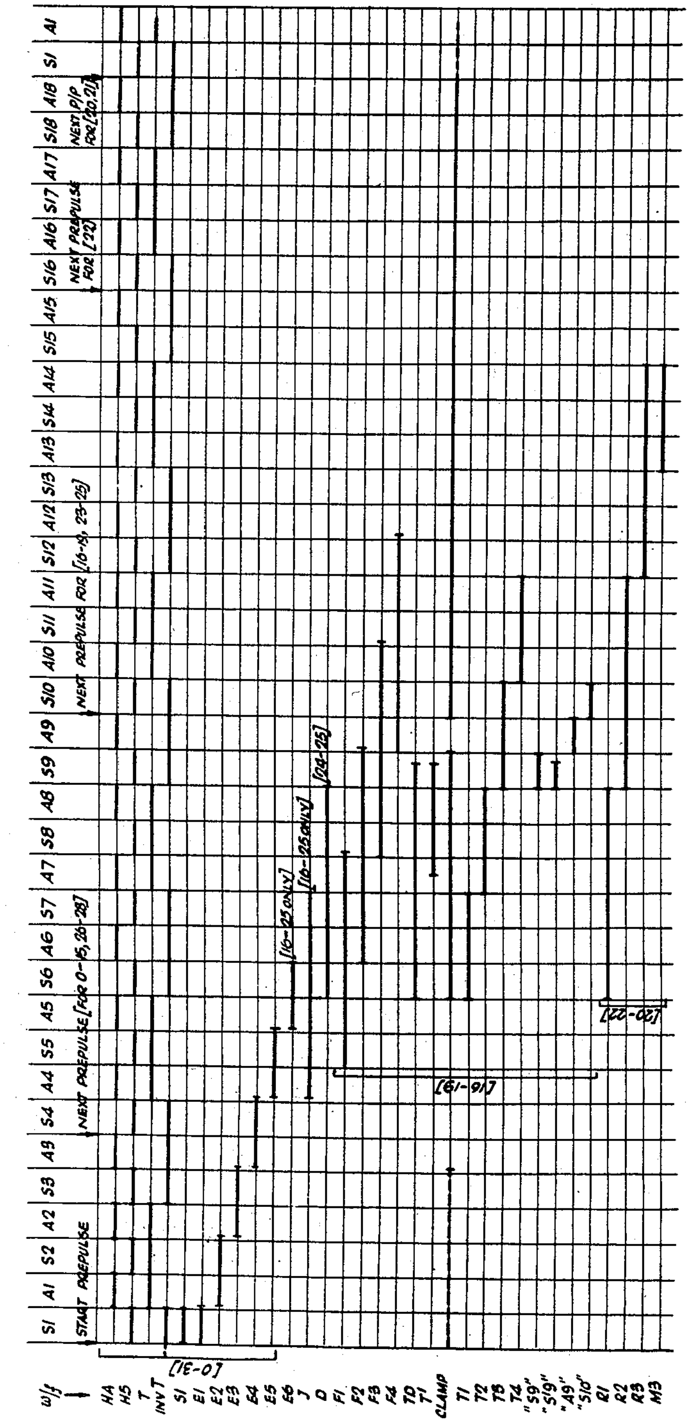

The P0 waveform is applied as a reversing pulse input to a trigger circuit FF11 whose respective antiphase outputs constitute the HA and HS waveforms, Fig. 2*a*: (In such Fig. 2 the thick line parts indicate the active or negative-going periods only of the various waveforms). The active (negative) periods of these two waveforms HA, HS define respectively the alternate action and scan beats of the machine rhythm.

The P0 waveform is also applied to a further pulse frequency divider circuit PND2 having a division ratio of 3:1 and the output from such circuit, consisting of a pulse once every 30 microseconds, is applied through gate G100 controlled by the HA waveform as a triggering medium for a further trigger circuit FF12. The resetting input of this trigger circuit is similarly supplied with the output from circuit PND2 by way of gate G101 controlled by the HS waveform. The respective antiphase outputs of circuit FF12 constitute the T and INV T waveforms, Fig. 2*a*. The T waveform (differentiated) is applied as a reversing pulse input to a further trigger circuit FF13 which provides the W waveform, consisting of a square pulse wave of half the frequency of the T waveform.

The commencement of each bar period is marked by a starting or prepulse signal. This is constituted by a selected P0 pulse and is derived from gate G102 controlled by a number of different waveforms which serve to prevent the issue of a further prepulse signal until the termination of the requisite number of beats for carrying out the particular operation called for by the particular order in the control system of the machine in a manner analogous to that described in reference C. Key switch K1 permits the issue manually of an initial start signal.

The prepulse signals are applied as a triggering input to a trigger circuit FF14 which is reset by the HA waveform and provides the E1 waveform, Fig. 2*a*. The antiphase INV E1 waveform, differentiated, is used as a triggering input to a further trigger circuit FF15 also reset by the HA waveform and providing the E2 waveform, Fig. 2*a*. Further trigger circuits FF16, FF17 and FF18, similarly arranged, serve to provide the E3, E4 and E5 waveforms, Fig. 2*a*, while a further trigger circuit FF19 provides the E6 waveform, Fig. 2*a*, only for orders numbered 16—25.

The S1 waveform, Fig. 2*a*, accurately defining the S1 beat of each bar is formed in gate G103 by means of the HS and E1 waveforms. A further group of similar waveforms defining the S2, S3 . . . beats are formed in similar manner, such as indicated by gates G104, G105, G133, G134, G135 for accurately defining other scan and certain action beat peridos of the machine rhythm. A special part-beat defining waveform (digit intervals 0–7 only) known as the "S′9" waveform and shown in Figs. 2*a* and 2*b* is generated by trigger circuit FF33.

The cathode ray tube main store itself employs a number of special waveforms as described in detail in the aforesaid reference A but as the precise manner of operation of such store is of no major concern in the present invention these waveforms and their manner of generation are not described.

A number of further fundamental waveform generators more particularly associated with the control of "floating-point" operation of the accumulator are shown in Fig. 1*g* and include a multiplier control waveform generator MCR comprising three trigger circuits FF20, FF21 and FF22. The triggering input of the trigger circuit FF20, which provides the R1 waveform, Fig. 2*a*, is the S6 waveform (scan beat S6) applied through gate G107 opened only during orders numbered 20—22. The differentiated "0" or INV R1 output of this trigger circuit provides the triggering medium for the next trigger circuit FF21 whose "1" output provides the R2 waveform, Fig. 2*a*. The differentiated "0" output of this trigger circuit FF21 provides the triggering medium for the third trigger circuit FF22 whose "1" output provides the R3 waveform, Fig. 2*a*. All three trigger circuits are reset by the differentiated INV T waveform.

Figure 2B:
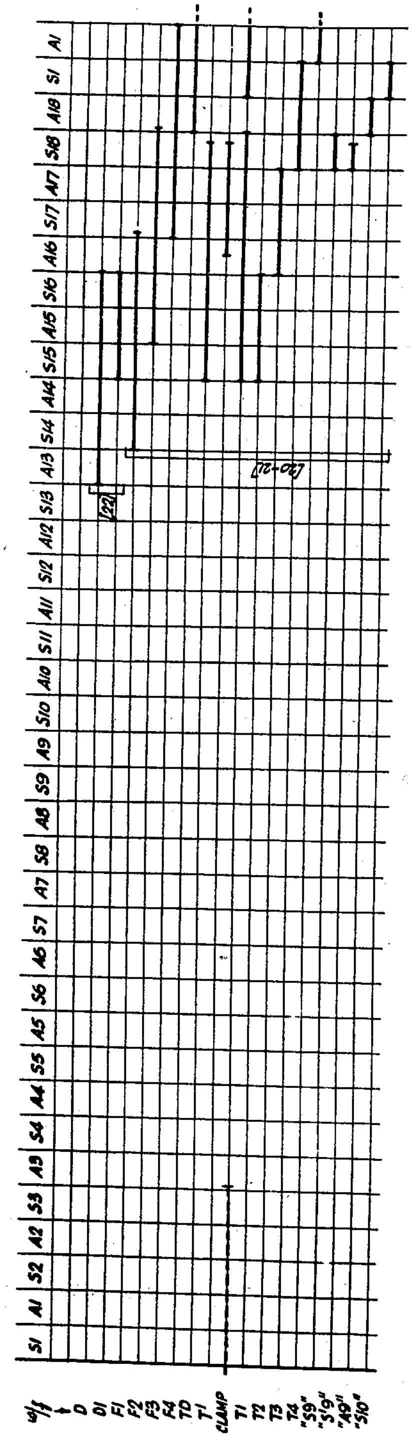
Figure 14:
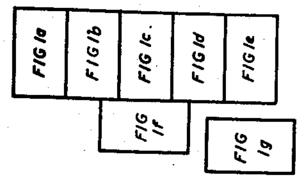
Fig. 14 is a diagram illustrating the manner in which Figs. 1*a* . . . 1*g* should be assembled to form a composite diagram.

The various F waveforms F1, F2, F3 and F4, whose form varies according to the type of order as shown in Figs. 2*a* and 2*b*, are provided by the generator FGR which comprises four trigger circuits FF23, FF24, FF25 and FF26. The first trigger circuit FF23 has its triggering input terminal supplied with the S5 waveform by way of gate G108 opened only for orders numbered 16—19 or with the HS waveform by way of gate G109 which is controlled by the M3 waveform and a control potential which is active for all orders except 22. The "1" output of this trigger circuit provides the F1 waveform which also forms a control medium for gate G110 which is also controlled by the HA and INV T waveforms and whose output provides the triggering medium for the trigger circuit FF25 which provides the F2 waveform. The differentiated "0" output of trigger circuit FF23 provides a triggering medium for the third trigger circuit FF24 which provides the F3 waveform while the differentiated "0" output from the trigger circuit FF25 provides the triggering medium for the fourth trigger circuit FF26 which provides the F4 waveform. The trigger circuits FF23 and FF24 are reset by the output from gate G111 supplied with the P1, HS and T waveforms while the trigger circuits FF25 and FF26 are reset by the output from gate G112 which is supplied with the P1, HA and INV T waveforms.

The *p* waveform generator PGR1 comprises a pair of gates G113 and G114. Gate G113 is controlled by the T1 and the >waveforms (described later) while gate G114 is controlled by the T2 and the <waveform, also described later. The respective outputs of the gates, when combined, form the *p* waveform. The *p′* waveform is similarly provided by the generator PGR1 which also comprises two gates G115 and G116 the first of which is controlled by the T1 and the <waveforms and the other gate G116 is controlled by the T2 and the >waveforms. The respective gate outputs are combined to form the *p′* waveform. The J waveform, Fig. 2*a*, is provided by generator JGR which comprises a trigger circuit FF28 whose triggering input is provided by the E5 waveform through gate G118 opened only for orders numbered 16—25. The circuit is reset by the differentiated T waveform. The D waveform, Figs. 2*a* and 2*b*, also varies in form according to the order in use and is provided by the D waveform generator DGR comprising trigger circuit FF29 whose triggering input terminal is supplied either with the M3 waveform through gate G119 opened for order number 22 only or with the S6 waveform through gate G120 opened for orders numbered 24 or 25 only. The resetting of this trigger circuit FF29 is effected either by the T waveform through gate G121 opened for order 22 only or by the INV T waveform through gate G122 opened for all orders except 22. The D1 waveform, Fig. 2*b*, is provided by the generator D1GR comprising a gate G123 supplied with the D and T waveforms.

The T′ waveform, Figs. 2*a*, 2*b*, also varies according to the order and is provided by generator TGR comprising a trigger circuit FF30 whose triggering input is supplied with the P5 waveform through gate G124 controlled by the T2 waveform, and whose reset terminal is supplied either with the E1 waveform or with the P7 waveform through gate G125 controlled by the T3 waveform. The TD waveform, Figs. 2*a*, 2*b*, is supplied by the generator TDGR comprising a trigger circuit FF31 whose triggering input is supplied with the T′ waveform and whose reset terminal is supplied either with the E1 waveform, the differentiated INV T′ waveform or the KXC waveform which is derived from a manually operable "clear" key switch (not shown). The T1 waveform, Figs. 2*a*, 2*b*, is derived from gate G129 supplied with the F1 and INV T waveforms, the T2 waveform, Figs. 2*a*, 2*b*, from gate G130, the T3 waveform from gate G131 and the T4 waveform from gate G132.

The Clamp waveform also varies in form according to the order and is shown in Figs. 2*a*, 2*b*. This waveform is provided by generator CGR comprising trigger circuit FF32 whose triggering input is supplied with the T1 waveform and S10$^{x}$ waveform which is generated by gate G126. The reset terminal of this trigger circuit is supplied with the E4 waveform and the A9$^{x}$ waveform which is generated in gate G128.

A number of further waveforms whose form is dependent upon the numerical or sign values of the actual number signals operating within the machine, such as the>, the <and Sign waveforms, are generated by elements of the accumulator itself and wlil be described later.

*Main data word store and control*

The main data store MS and the control system CL are shown in Fig. 1*f* and are substantially identical in both form and operation with those described in detail in reference A. They will therefore be only briefly referred to. The main data store comprises ten cathode ray tubes C0, C1 . . . C9 each operating with the defocus-dash system of storage as described by F. C. Williams et al. in Proc. I.E.E., October 1948, vol. 96, Part II, page 183 and Proc. I.E.E., July 1952, vol. 100, Part II, page 523. The storage tubes operate at a digit repetition frequency of 100 kc./s. with an approximately square raster of 1024 storage locations in the form of 32 lines of digit storage areas each registering 32 discrete digits on the face of each cathode ray tube.

The tube C0 . . . C9 serve to register respectively the ten separate digits 0–9 of a word, digit 0 being the least significant and digit 9 the most significant digit of the word. The movement of all of the beams of the various tubes is effected simultaneously and by a single set of beam deflection means comprising an X-deflection waveform generator XG for movement in the X or row scanning direction and a Y-deflection waveform generator YG for movement in the other or line selecting direction. Thus, any one of 32 discrete positions of the tube beam on each of the screens of the ten storage tubes may be selected by applying a chosen combination of five "on" or "off" input signals to the X-deflection generator XG and any required one of the 32 separate line levels similarly selected by applying an appropriate combination of five input potentials to the Y-deflection waveform generator YG. These two combinations of separate five signal control groups are derived respectively from spaced tapping points along a delay line network DLU1 consisting of ten 1 microsecond delay elements which form part of a circulating signal path of 20 microseconds delay time completed through adder ADR by way of gate G701. CIS is a 10 digit storage register whose circulation path is completed through gate G705 and which serves to retain the last used CI number as explained in reference A.

The inputs and outputs of the main data store MS, being in parallel form, require the provision of series-to-parallel and parallel-to-series signal conversion means WIU and ROU. Input signals to unit WIU are fed from the accumulator and other parts of the machine over lead 101 while output signals from the unit ROU are fed to such other parts over lead 100. B-modifier signals, derived from the B-registers of the accumulator are supplied to the adder ADR over lead 130 for combination with the address section of a present instruction PI (order) word read out from the main data store and supplied through gate G706 in a manner substantially identical with that described in detail in reference A.

For the purpose of receiving and subsequently staticising the present function part (PF) of each order, there is provided a staticisor STR comprising a register formed by a further series of unit delays which are likewise arranged to form part of a continuous regeneration loop including gate G704. This register is arranged to be fed with input signals by way of gate G600 from the output bus-bar 100 of the main data store. The output signals available at the output point of each of the aforesaid unit delays of the present function register are applied by way of tappings each to the triggering input of a related trigger circuit, by way of an individual controlling gate, all of the controlling gates being controlled by a strobe pulse constituted by the P4 waveform. Thus, the form of each separate digit of a ten-digit word signal applied to said present function register can be staticised on the associated staticisors by opening the related gate by the strobe pulse, the word signal continuing to circulate and the staticisors continuing to provide their outputs $f0^0$, $f0^1$, $f1^0$, $f1^1$ . . . $f9^0$, $f9^1$ representing the staticised digit signals until the aplication of a reset pulse constituted by the differentiated INV S2 waveform.

The various staticisor outputs are decoded in conventional manner to provide a variety of function control waveforms. A selection of such decode means is illustrated by gates G710, G711, G712 providing respectively the decode waveforms signalling order 1, order 22 and the order group 16–23.

*Accumulator*

Referring now to Figs. 1*a*–1*e* the accumulator arrangements shown comprise a first input busbar A, a second input busbar B, a third input busbar C and a common output busbar O. Input lead 100 from the main data store MS, Fig. 1*f*, is connected to busbar A by way of gate G1. Lead 101 constitutes an output connection to the main store of the machine and corresponds, substantially, to the lead 124 of Fig. 1 of the aforesaid reference A.

A complementer circuit CM1 operative to effect complementing when its control input terminal 140 is energised negatively but otherwise acting only to pass signals therethrough unaltered, has its input terminal 141 connected to busbar A and its output terminal 142 connected to circuit point *a*1 feeding four gates G2, G3, G70 and G90. The complementer circuit CM1 may be of any suitable known form, for instance, as described by F. C. Williams et al. in Proc. I.E.E., vol. 99, Part II, page 107 but modified to the extent that an additional delay element and pulse shaper circuit are included in series with the signal output circuit whereby the device has an overall delay time of 1 microsecond. Busbar C is connected by way of an extender circuit comprising 1 microsecond delay DL2 and gate G74 to circuit point *c*1 feeding two gates G4, G5. The outputs from gates G2 and G4 are combined and applied by way of 3 microsecond delay DL3 to one input terminal *a*4 of a composite computing unit CMU which will be described in greater detail later with reference to Fig. 5 but which, for the moment, may be regarded as an adding circuit. The outputs from gates G3 and G5 are also combined and applied to the input terminal $c1^x$ of a variable delay device VDC which will be referred to in greater detail later with reference to Figs. 6*a*–6*c* and by which an adjustable degree of time delay of between 2 and 33 microseconds, equivalent to a variation of 31 digit intervals, may be imposed under the control of an electric signal on lead 132 to the input terminal $a1^{xx}$ of a delay control section CVDC for the device VDC. The output terminal 133 of device VDC is connected through gate G6 to the second input terminal *b*4 of the computing unit CMU and also to gate G80. The input busbar B is also connected by way of 4 microsecond delay DL22 to the input terminal *b*4 of the computing unit CMU. The output terminal *f*5 of computing unit CMU is connected through gate G7 and 15 microsecond delay DL33 to output busbar O.

The output from gate G7 is also fed by way of lead 102 to the signal input terminal 134 of a device ZCR known as the Z-counter which will be described in detail later with reference to Figs. 4*a*, 4*b*. Output terminal *f*5 of unit CMU is also connected by way of gate G8 to the reset terminal of trigger circuit FF1 which forms the generator of the Test B>O waveform, and to triggering terminal of trigger circuit FF2 through inverter M1 and gate G10. The triggering terminal of trigger circuit FF1 is supplied through gate G9 while the reset terminal of trigger circuit FF2 is supplied in the manner shown with the E1 and differentiated INV T waveforms. The trigger circuit FF2 provides the Exponent Test waveforms ">" and "<". The Z counter ZCR provides the Z1, Z2, Z3, Z4 and Z5 waveforms and the latter are fed to the variable delay control CVDC. As will be described later, the Z counter ZCR includes means by which such Z1 . . . Z5 waveform outputs can be converted into a representative pulse train signal which is provided at output terminal 135 and is fed by way of lead 136 to busbar A, and also by way of lead 137 to gate G81.

A 30-digit accumulator register XA, Fig. 1*d*, comprises a regenerative loop including three 10 microsecond delays DL11, DL12, DL13 and a control gate G12 between input terminal 104 and output terminal 107. The input terminal 104 of such register is supplied by way of lead 170 and gate G13 from the output point *a*1 of the complementer CM1, and is also connected for supply from busbar O by way of 5 microsecond delay DL6, shaper circuit SC6 and gate G14. A further input to terminal 104 is from the output terminal 133 of the variable delay device VDC by way of gate G80 while further inputs are from gate G81 through "shuffle" or holding circuit HC1 and gate G82 and also from gate G49. The output terminal 107 of the register XA is connected through gate G16 to the input busbar C.

A 10-digit word register YA, Fig. 1*d*, comprises a regenerative loop including 10 microsecond delay DL7 and control gate G17 connected between input terminal 108 and output terminal 109. The input terminal 108 of this YA register is supplied through gate G18 from the output busbar O while the output terminal 109 is connected through gate G19 to busbar B and also through gate G20 to output lead 101 to the main store MS, Fig. 1*f*. A direct transfer path through gate G21 is provided between output busbar O and input busbar B.

A multiplier circuit indicated generally at M, Fig. 1*a*, comprises a closed 50 microsecond delay loop LM including a plurality of serially arranged adding circuits ADR1, ADR2 . . . ADR5 with interposed 2 microsecond delays together with the further delays and control gate G22 as shown. This multiplier circuit is broadly similar to that described in reference D and has one output terminal 112 connected by way of lead 111, gate G23 and lead 113 to the input terminal 146 of a 30-digit register XR. An alternative output terminal 114 of the multiplier loop LM is connected by way of lead 115 and gate G24 to the input busbar A. The multiplier number input terminal 110 of the multiplier circuit M is supplied by way of gate G25, lead 116, a controlled complementer CM2, similar to the complementer CM1, and gate G26 from the output terminal 147 of the register XR while the multiplicant number input terminal 109 of the multiplier circuit M is arranged for supply over lead 118, inverter N3 and 4 microsecond delay DL6 from different tapping points on a further 30 microsecond delay line loop forming part of a further 30-digit register XD. These alternative tapping points are controlled respectively by gates G27, G28, G29.

The register XR, Fig. 1*b*, includes three 10 microsecond delays DL15, DL16, DL17 and has a control gate G30. Its output terminal 147 is also connected by way of gate G31 to the input busbar A while the output fed from output terminal 147 through gate G26 can also be routed by way of lead 148 and gate G49, Fig. 1*d*, to the input terminal 104 of the register XA. An alternative input to terminal 146 of the register XR is provided from the input lead 100 through gate G32.

The register XD comprises three 10 microsecond delays DL18, DL19, DL20 and a control gate G46. It has an input terminal 121 and three separate output terminals as already described. The input terminal 121 is supplied either by way of gate G90 and lead 122 from the output point *a*1 of the complementer CM1 or by way of gate G34 from the output of the complementer CM2.

A further 10-digit word register YD is provided having a 10 microsecond delay DL21 and a control gate G47 between its input terminal 123 and output terminal 124. The input terminal 123 is supplied by way of gate G35 from output busbar O while the output terminal 124 is connected by way of gate G36 to input busbar A.

A direct transfer path between output busbar O and input busbar A is provided by way of gate G48.

As shown in Fig. 1*e*, between the output busbar O and the input busbar B are connected a group of 8 separate 10-digit delay line registers B0, B1 . . . B7. These correspond to the B-store arrangements of the aforesaid reference A and each have their respective input terminals 125 connected by way of individual control gates $G37^0$ . . . $G37^7$ to a common lead 126 which is fed by way of gate G38 from the output busbar O. The respective output terminals 127 of the B-store registers are likewise connected through individual control gates $G39^0$ . . . $G39^7$ to a common output lead 128 which is connected through gate G40 to the input busbar B. The output lead 128 is also connected by way of gates G41 and G42 to lead 130 which is connected to the adder circuit of the associated control system of Fig. 1*f*. A separate direct output connection is provided from the output terminal 127 of the first B-store register B0 by way of lead 137 and gate G43 to gate G42 and lead 130. Each of the B-store registers includes a single 10 microsecond delay with an associated control gate $G44^0$ . . . $G44^7$ controlled in the manner shown from inputs derived from gate G45. A further output connection extends from lead 128 by way of gate G55 and lead 173 to the output lead 101.

The various waveforms B.DR0 . . . B.DR7 shown controlling gates $G39^0$ . . . $G39^7$, $G44^0$ . . . $G44^7$ and others are B decode waveforms derived in the usual manner from the different available combinations of the *b* digits of an instruction word.

Means are provided for testing whether a stored B word is of zero value and comprise a trigger circuit FF3 whose triggering input is supplied by way of gate G56 from the lead 128 and whose reset terminal is supplied by way of gate G57.

The remaining elements of the arrangement shown in Figs. 1*a*–1*g* including the various controls for the different gates and the like will not be specifically described as their manner of operation is either self-evident or will be apparent from the subsequent description of the manner of operation under different conditions.

*Composite computing unit CMU*

Figure 5:
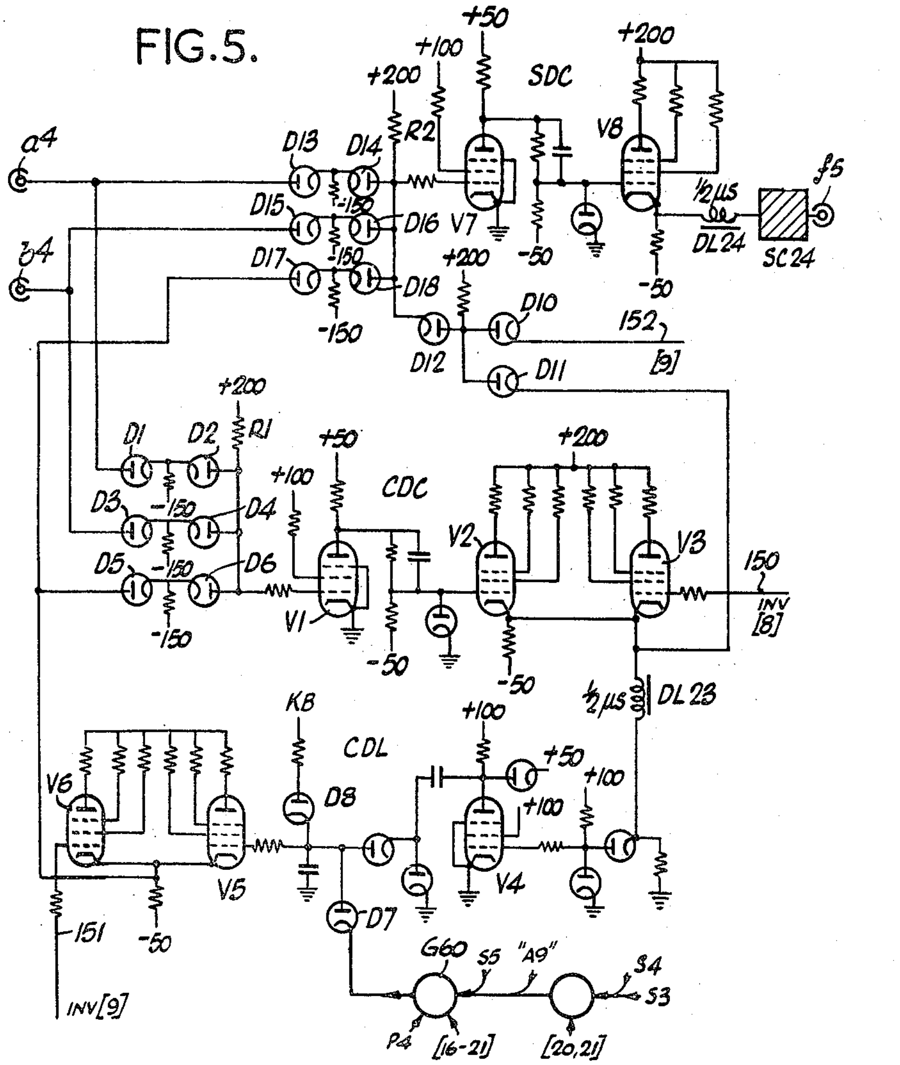

The arrangements of the composite computing unit CMU are shown in detail in Fig. 5 and comprise a sum discriminator circuit SDC, a carry discriminator circuit CDC and a carry delay circuit CDL arranged in a manner similar to that described in British Patents Nos. 683,882 and 692,424.

The carry discriminator circuit comprises valves V1, V2 and V3 and the associated diodes D1 . . . D6. Its function is to determine when a carry digit is to occur, i.e. when the sum of the inputs equals 2 or 3. There are three inputs to the carry discriminator circuit by way of the diode pairs D1 and D2; D3 and D4 and D5, D6. Diode D1 is connected to input terminal *a*4 while diode D3 is connected to input terminal *b*4. Diode D5 is connected to the output of the carry delay circuit CDL described later.

Each input controls a negative leak current of I*m*A and when a negative potential occurs on any input, such current of I*m*A is switched to the control grid of valve V1. A positive leak current of 1½I*m*A is permanently supplied to the control grid of valve V1 through resistor R1 so that at least two negative inputs must occur simultaneously before the grid voltage of V1 drops and causes cut-off of space current in the valve. The anode of valve V1 is D.C. coupled to the control grid of valve V2 which is arranged as a cathode follower whereby the output carry digits at the valve cathode appear as positive-going pulses rising from a negative level to a level of approximately 0 volt provided the control potential applied at terminal point 150 to the control grid of the associated valve V3 is at a negative level.

The acrry delay circuit CDL comprises valves V4, V5 and V6 and their associated diodes. The output from the carry discriminator circuit CDC is supplied by way of the ½ microsecond delay line DL23 to the control grid of valve V4 where the output pulse is shaped and retimed by the reshaper circuit constituted by this valve and valve V5 in conjunction with diode D8 and the KB waveform. The output at the cathode of valve V5 provides the delayed carry pulses occurring 1 microsecond, i.e. 1 digit interval, behind the initiating pulse output from the carry discriminator circuit CDC. This output is gate controlled by means of valve V6 whose control grid is supplied with a control waveform, referred to later, at terminal point 151. Such control waveform is continuously negative whilst the circuit is being used as an adder.

A pulse cannot occur by normal means at the output of the delay carry circuit when the least significant digits of two input numbers are being added since it takes at least 1 microsecond to generate a delayed carry pulse. A pulse occupying this least significant digit position can accordingly be deliberately introduced at this point whereby thes um $(x+y+1)$ is obtained. When this action is required the additional pulse is introduced at input terminal point 153 and through diode D7.

The sum discriminator SDC is constituted by valves V7 and V8 with their associated diodes D10 . . . D18 and has four input channels through diode pairs D11, D12; D13, D14; D15, D16 and D17, D18. Diode D11 is supplied with the output from the carry discriminator circuit CDC, diode D13 is connected to the input terminal $a4$, diode D15 is connected to the input terminal $b4$ and diode D17 is connected to the delayed carry output from valves V5 and V6.

As with the carry discriminator circuit CDC the inputs through diode pairs D13, D14; D15, D16 and D17, D18 each control a negative leak of I$m$A and cause such leak current to be switched to the control grid of valve V7 whenever the related input is negative-going. Valve V7 is provided through resistor R2 with a permanent positive leak to its control grid of ½I$m$A while the further input through diodes D11 and D12 serves, when a positive-going carry pulse from CDC is present, to switch a further positive leak current to 2I$m$A to the control grid of valve V7. When pulses occur on two inputs no sum output is required and this is achieved by the switching of the positive leak of 2I$m$A to the control grid of valve V7 by the action of the carry output pulse through diodes D11, D12. When pulses occur on all three inputs the carry pulse output still causes switching of the bleed current of 2I$m$A to the control grid of valve V7 but the simultaneous switching of three separate negative bleed currents of I$m$A through diodes D14, D16, D18 overcomes the total positive bleed current of 2½I$m$A so that valve V7 is again cut off at its control grid. When only a single input is present there is, of course, no output carry pulse and such single negative bleed current of I$m$A is sufficient to overcome the permanent positive ½I$m$A bleed current to cause cut-off of valve V7.

When valve V7 is cut off at its control grid a positive-going output pulse providing the required sum output signal is generated and this is fed through valve V8 arranged as a cathode follower into the ½ microsecond delay line DL24 and thence to a read and retime (i.e. shaper) circuit SC24 of a form similar to that illustrated in connection with valves V4 and V5 whereby the final output at terminal $f5$ is a negative pulse accurately delayed exactly 1 microsecond behind the time of the input pulses at terminals $a$ and/or $b$.

Such circuit arrangement can, by the additional control potentials provided at terminal points 150, 151 and 152 be made to operate as either a "not equivalent to," an "and" or an "or" circuit as follows.

The logical operation of "not equivalent to" corresponds to addition without carry and is accordingly achieved by inhibiting the output of the carry delay circuit CDC. This is achieved by maintaining the control waveform voltage applied to terminal point 151 at a positive level instead of at a negative level. The control waveform at terminal point 150 remains continuously at a negative level and that at terminal point 152 at a positive level as for normal addition.

To perform the logical operation "and" the control waveform applied to terminal point 151 is made negative and those at terminal points 150 and 152 are made positive. When the control waveform at terminal point 150 is positive, the output from the carry discriminator circuit CDC remains continuously positive and provides an output potential which continuously supplies the additional 2I$m$A positive leak current to the control grid of valve V7. A continuous delay-carry output also occurs so that a permanent negative leak of I$m$A is also switched to the control grid of valve V7. To overcome the remaining positive leak of 1½I$m$A, pulses must occur simultaneously in both of the inputs to termnials $a4$ and $b4$ and the output at the anode of valve V7 therefore corresponds to the logical operation "and."

The logical operation of "or" is performed by making control waveform at terminal point 151 positive and the control waveform at terminal point 152 negative. The state of the control waveform at terminal point 150 is immaterial. When control waveform at terminal point 151 is positive no delayed carry digits are possible while the negative level of the control waveform at terminal point 152 inhibits the possibility of switching the additional 2I$m$A positive leak current to the control grid of valve V7 which accordingly remains continuously with a positive leak of only ½I$m$A. Thus an input pulse at either one (or both) of the input terminals $a4$ and $b4$ will serve to provide an output at the anode of valve V7 and provide the desired function.

As indicated in Fig. 5, the terminal point 150 is supplied with the INV [8] output from the decode circuits associated with the staticisor STR whereby it is normally negative except during order number 8. Terminal point 151 is similarly supplied with the INV [9] waveform whereby it is negative at all times except during order number 9. Terminal point 152 is supplied with the [9] code waveform whereby it is negative only during order number 9. The additional pulse input through terminal point 153 is derived through gate G60 which is controlled in the manner shown and is supplied with the P4 pulses which, as will be seen later, coincide in timing always with the first or least significant digit interval time of the pulse train arriving at either of the input terminals $a4$ and $b4$ due to the presence of a total of 4 microseconds delay in the path to such terminals from the input busbars A, B or C.

*Z counter*

The Z counter ZCR of Fig. 1$c$ is shown in schematic form in Fig. 4$a$ while a detailed circuit diagram of one of the five similar stages of such counter is shown in Fig. 4$b$.

Referring first to Fig. 4$b$, the counter section C1 of Fig. 4$a$ is constituted by valves V10 and V11 with associated diodes D20 . . . D26 and a ½ microsecond delay line DL30. In this counter section, valve V10 is normally cutoff at its control grid by the KD waveform applied through diode D20 and the resultant anode potential is held clamped at +50 v. through diode D22. Valve V11 is normally held with its control grid positive by the clamping action of the T′ waveform applied through diode D26 whereby the cathode output from valve V11 remains steady at approximately earth potential and no input is applied to the delay line DL30 connected between the cathode of valve V11 and the control grid of valve V10. Upon removal of the positive clamping level of the T′ waveform the next positive-going KD pulse applied to the control grid of valve V10 turns the valve "on" and thereby causes generation of a negative-going pulse at the valve anode which pulse is fed via diode D24 to charge capacitor C10 negatively and also to drive the control grid of valve V11 negative thereby initiating a negative-going output pulse at the cathode of such valve. Due to the presence of capacitor C10 the lowered potential of the control grid of valve V11 persists until the next positive-going spike of the KB waveform applied through diode D25 serves to discharge the condenser C10 and again to raise the potential of the control grid of valve V11 to its normal level thereby terminating the output pulse at the valve cathode.

This output pulse is available at output terminal 155 and is also fed back through the delay line DL30 to arrive, ½ microsecond later, at the control grid of valve V10 where it effectively nullifies the action of the next KD pulse. Valve V11 accordingly remains cut-off and no negative pulse is generated at the valve anode for application as described above the valve V11. Thus, the next following digit interval is marked by the absence of an output pulse and accordingly no pulse is supplied through the delay line DL30 to the valve V10 so that in the next or third digit interval the KD pulse is again effective to turn "on" valve V10 and thereby to initiate a second negative-going output pulse at the cathode of valve V11. This cycle repeats so that in alternate digit intervals a negative-going output pulse is provided whereas in the intervening digit intervals no output pulse is present at output terminal 155.

Figure 4A:
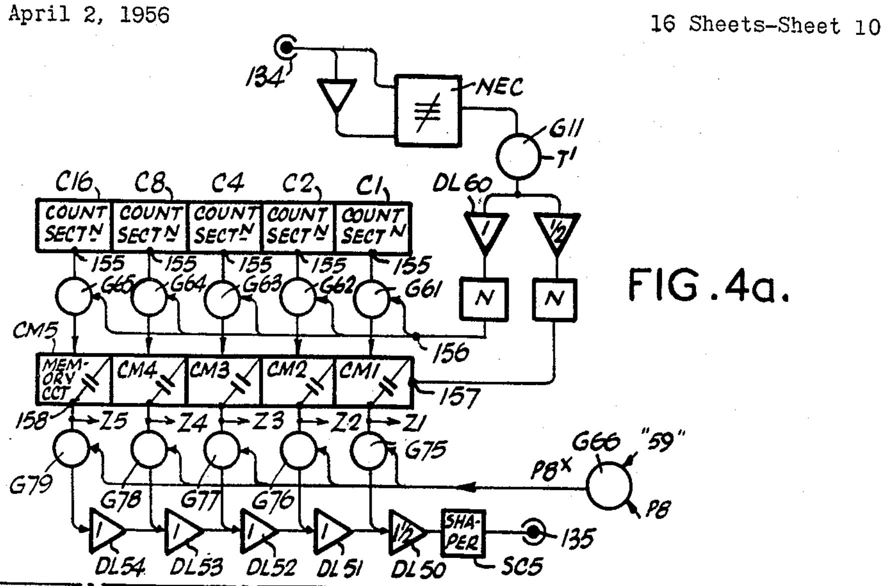
Figure 4B:
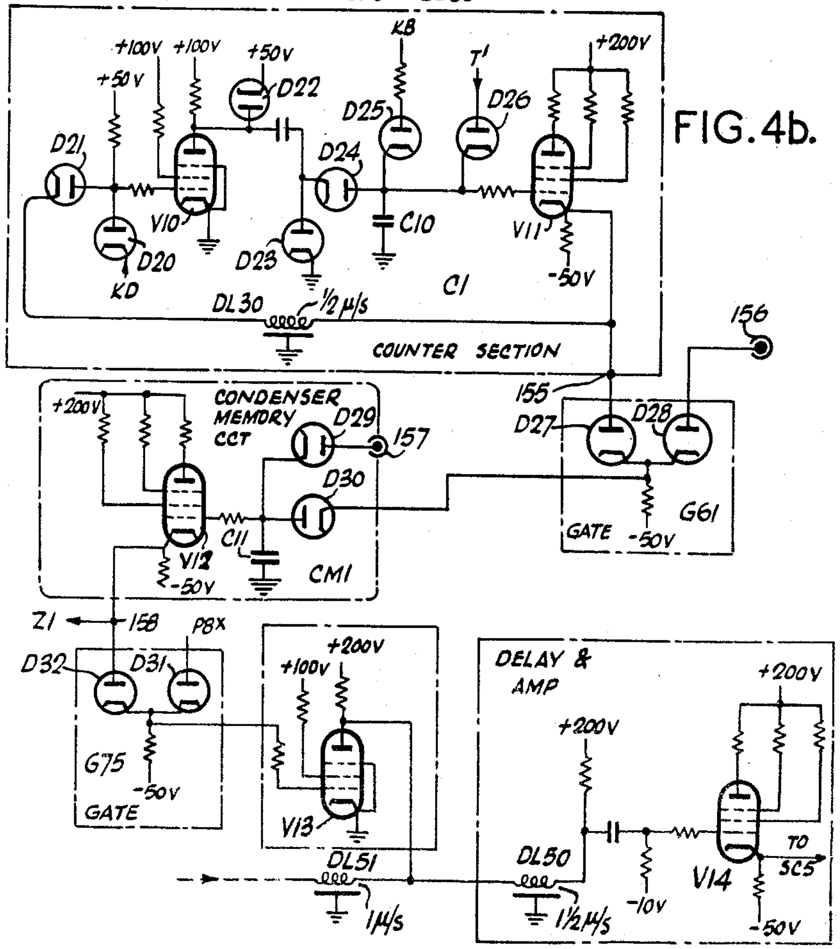

The remaining counter sections C2, C4, C8 and C16 of Fig. 4*a* are generally similar to that of C1 just described except that their respective delay lines, equivalent to delay line DL30 of Fig. 4*b*, have delay times of 1½, 3½, 7½ and 15½ microseconds respectively. In consequence the counter section C2 generates and provides at its output terminal 155 a group of two pulses in consecutive digit intervals followed by two digit intervals where no pulse is generated followed by a further two pulses and then two digit intervals without pulses and so on. The counter section C4 similarly provides at its output terminal 155 groups of four consecutive pulses with intervening gaps of four digit intervals, the counter section C8 provides at its output terminal 155 groups of eight consecutive pulses with intervening gaps of eight digit intervals and the counter section C16 provides at its output terminal 155 groups of sixteen consecutive pulses with intervening gaps of sixteen digit intervals.

The output pulses are generated in the manner just described only when the clamping waveform T' to diode D26 is negative-going. Taken as a group, the outputs from counter sections C1, C2, C4, C8 and C16 are accordingly as follows. In the first digit interval following unclamping the outputs are 00000 (reading from right to left in the order C1 to C16), in the next or second digit interval 11111 (decimal number 31), in the third digit interval 11110 (decimal number 30) in the fourth digit interval 11101 (decimal number 29) and so on. There is thus provided, after the first digit interval, a signal which represents a progressively decreasing count number of 31, 30, 29 . . . back to zero.

The output from each counter section C1 . . . C16 provides one input to an associated gate G61 . . . G65 which, referring to Fig. 4*b*, comprises in the case of the gate G61 for the counter section C1, diode D27 of the pair of diodes D27 and D28. The other diode D28 of this gate and of all of the similar gates associated with the other counter sections is supplied through terminal 156 with one or more read strobe pulses derived from the positions of change-over of digit values of the 32-digit answer number signal applied to input terminal 134 of the Z-counter and attained in a manner which will be described later. When opened by such read strobe pulse the particular output signal potential which is at that time present at the output terminal 155 of the associated counter section (zero or negative according to the count state) is available for feeding through diode D30 to a condenser memory circuit CM1 which comprises capacitor C11 connected across the grid to cathode input circuit of a cathode follower valve V12. The control grid of the valve V12 is also supplied by way of diode D29 with an erase input waveform through terminal 157. This erase waveform is also derived from the applied 32-digit answer number signal and consists of a positive-going pulse immediately preceding each read strobe pulse applied to terminal 156.

Upon opening of the gate circuit of diodes D27, D28 any negative potential available at the output terminal 155 of the associated counter section is fed through diode D30 to charge capacitor C11 negatively thereby lowering the control grid potential of valve V12 and serving to provide a resultant negative-going output from the valve cathode at the output terminal 158. This output forms the Z1 waveform.

The other condenser memory circuits CM2, CM3, CM4, CM5, Fig. 4*a*, associated with the remaining counter sections are similar and their respective output terminals 158 provide respectively the Z2, Z3, Z4 and Z5 waveforms.

If the output from any counter section is at zero level when the read strobe pulse occurs then the related Z waveform remains unaltered at zero level. Upon the occurrence of the next positive erase pulse at terminal 157, the capacitor C11, if previously charged, is discharged again and the circuit is returned to its normal condition in readiness to be set, if circumstances so dictate, upon arrival of the immediately subsequent read strobe pulse at terminal 156.

The output waveforms Z1, Z2, Z3, Z4, Z5 in addition to being made available directly from the condenser memory units CM1 . . . CM5 as sustained control potentials, are also capable of being converted into a representative serial pulse train by serialising arrangements comprising, in the case of the first counter section C1 shown in Fig. 4*b*, a gate G75 formed by diodes D31, D32, a valve V13 and a delay DL50. The Z1 waveform output is applied to diode D32 while the P8ˣ pulse waveform (which effectively defines the ninth or P8 digit interval of a particular beat period "S9" and which is formed by gating the normal P8 waveform by the "S9" waveform, Figs. 2*a*, 2*b*, in gate G66 of Fig. 4*a*) is applied to diode D31. If the Z1 output is negative at the instant of such P8ˣ pulse the control grid of valve V13 is driven negative with consequent generation of a positive pulse at the valve anode. This positive pulse then travels through the 1½ microsecond delay DL50 to the control grid of valve V14. The cathode output of this valve V14 is then applied to a pulse shaper circuit SC5 to emerge at output terminal 135 in digit interval P0 of the next following beat. The remaining serialiser circuits associated with the counter sections C2 . . . C5, Fig. 4*a*, are basically similar except that the interposed delays DL51 . . . DL54 are each of 1 microsecond delay time only whereby any pulses generated in the different circuits are correspondingly delayed so as to form, at output terminal 135, a 5-digit pulse train representing the state of the group of Z waveforms.

The respective read strobe and erasing potentials for terminals 156 and 157 are derived as follows. The input terminal 134, Fig. 4*a*, at which the output signals from the computing circuit CCV are made available over lead 102 is connected directly to one input of a not-equivalent circuit NEC and also by way of a 1 microsecond delay DL60 to the second input of such not-equivalent circuit. In consequence the not-equivalent circuit will provide an output pulse, indicative of non-equivalence, only when there is a change-over of the digit values of two immediately adjacent digit signals of the incoming number-representing pulse signal train on lead 102. When such a change-over of digit signal values occurs the resultant negative-going output pulse from the not-equivalent circuit is fed through gate G11 (also opened by the T' waveform) and thence firstly by way of ½ microsecond delay line DL61 and an inverter N6 to act as the necessary positive-going erase voltage for the control terminal 157 of the condenser memory circuits CM1 . . . CM5 and secondly by way of a 1 microsecond delay DL62 and a further inverter N7 to act as the read strobe input at terminal 156 for the gate circuits G75 . . . G79.

The operation of the complete counter ZCR is thus as follows. The counter sections C1 . . . C5, upon unclamping by the negative pulse of the T' waveform, proceed to provide a series of count outputs indicative of 31, then 30, then 29 and so on downwards in succeeding digit intervals. The instantaneous count state is transferred in parallel form to each of the related condenser memory circuits CM1 . . . CM5 each time there is a change-over in the digit values of the respective digits of the incoming signal on lead 102 and the form of the Z waveform is adjusted accordingly. At each change-over time, the previous setting of the condenser memory circuits is erased so that the final state of the condenser memory circuits represents numerically the position of the last change-over point of the number signal supplied over lead 102. This is indicated by the form of the related Z waveforms which are used to control the delay setting of the variable delay circuit VDC. The derived serial pulse train from terminal 135 likewise indicates the Z-counter setting.

*Variable delay device and control*

The variable delay device VDC, Fig. 1*c*, and its associated control CVDC employs a plurality of separate delay line sections which may be rendered either operative or inoperative to effect delay in a manner which will first be briefly described with reference to Fig. 6*a*. In this figure IE indicates the inductive element of a delay line of the now well known distributed capacitance type and with which is an associated capacitive electrode CE as described, for example, in reference B. The opposite end terminals of the inductive element IE are connected to input and output terminals *i* and *o* respectively while the capacitive electrode is connected to a further terminal *u*. the input terminal *i* is connected to the output of a first buffer amplifier BA1 whose input is supplied with signals from input terminal I. The output terminal *o* of the inductive element is connected to the input of a suitable transmission stage, such as a cathode follower valve or a pulse shaping circuit, whereby the somewhat distorted pulse form output signals obtained from the delay line may be converted back into standard square pulse form. The output of such transmission stage supplies the output terminal O. The capacitive electrode CE is connected to switching means, indicated schematically at SM, by which such capacitive electrode may be connected either directly to a source of constant potential, e.g. earth, or, alternatively, to the output of a second buffer amplifier BA2 whose input is connected in parallel with that of the first buffer amplifier BA1 for supply from the input terminal I. When the capacitive electrode CE is connected by the switching means SM to the source of constant potential, e.g. earth, the delay line section DL will be effective to cause a signal delay determined by the characteristics of the line. If, however, by alteration of said swtiching means SM, the capacitive electrode CE is connected to the output of the amplifier BA2 whereby the capacitive electrode as well as the inductive element is supplied with the input signals, the section as a whole is ineffective to cause delay. Under the latter conditions, the signals at the output terminal O will be a substantially undelayed version of the input signals at terminal I.

Figure 6C:
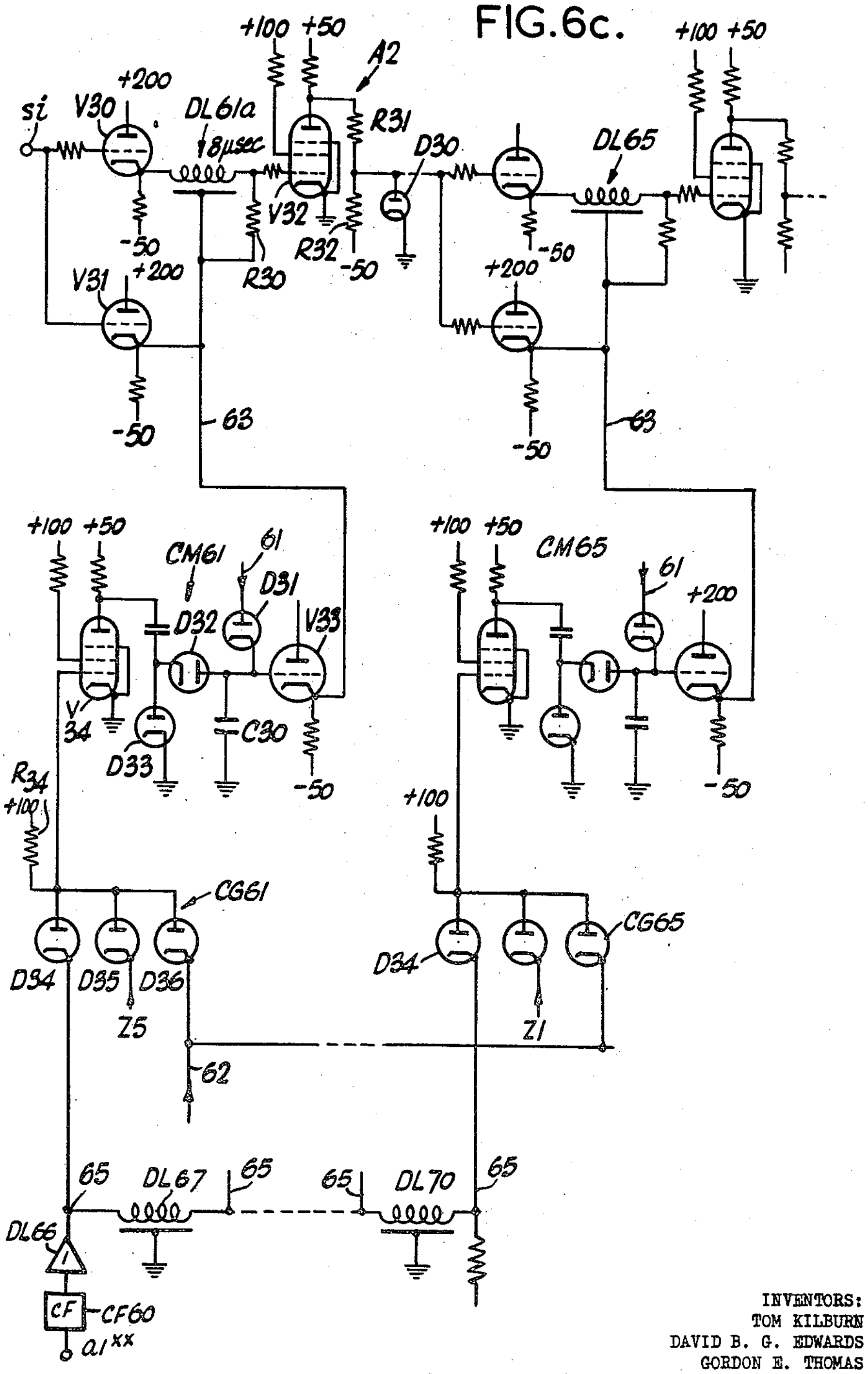

The variable delay circuit VDC of Fig. 1*c* is shown in greater detail in Figs. 6*b* and 6*c*. Fig. 6*b* is a block schematic diagram of the arrangements, while Fig. 6*c* is a detailed circuit diagram of the first and last of the five fundamentally similar variable delay sections.

Referring first to Fig. 6*b*, the signal input terminal $c1^x$ is connected through a first (fixed value) delay element DL60 having a 2 microsecond delay time to an amplifier A1 of any suitable form. The output of the latter supplies signals to a second delay element DL61*a* whose delay time can be altered from 8 microseconds to zero. The output from this element supplies, through amplifier A2, a further similar delay element DL61*b* whose delay time can likewise be altered from 8 microseconds to zero. The output from delay element DL61*b* is applied through a pulse amplifier and reshaper SC1 to a further delay element DL62 whose delay time can also be altered from 8 microseconds to zero. The output from this element DL62 is fed through amplifier A3 to further delay element DL63 whose delay time can be altered from 4 microseconds to zero. The output from this element DL63 is then applied through amplifier A4 to delay element DL64 whose delay time can be altered from 2 microseconds to zero. The output from this delay element DL64 is then applied through amplifier A5 to a final delay element DL65 whose delay time can be altered from 1 microsecond to zero and the output from such final element DL65 is fed through pulse amplifier and reshaper SC2 to output terminal 133. When each of the elements DL61*a*, DL61*b*, DL62, DL63, DL64 and DL65 is operative to impose its individual delay, the total delay time between terminals $c1^x$ and 133 is 33 microseconds but by appropriately rendering selected elements inoperative such delay time can be altered in steps of 1 microsecond down to a minimum value of 2 microseconds.

Each of the delay elements DL61*a* . . . DL65 has a control lead 63 the energisation state of which determines whether or not the associated delay element is to be operative to effect its assigned delaying action and in each case this lead is connected to an associated capacitive memory circuit CM61, CM62, CM63, CM64, CM65, a common memory circuit CM61 being used to control each of the two separate 8 microsecond delay elements DL61*a*, DL61*b* to form, what is effectively, a 16 microsecond delay element. The state of such condenser memory circuits is determined by the respective inputs supplied thereto from a series of five control gate circuits CG61, CG62, CG63, CG64, CG65. These gate circuits are arranged to be opened at instants determined by a strobe or control pulse waveform on lead 62 whereby the associated condenser memory circuit is set, either in accordance with the instantaneous potentials of the Z1, Z2 . . . Z5 waveforms from the previously described Z waveform generator ZCR which exist respectively on the five separate parallel control leads 64 or, alternatively, in accordance with the instantaneous potentials existing at the output terminal points 65 of a series of delay line elements DL66 . . . DL70 to which an input pulse train is supplied by way of control input terminal $a1^{xx}$ through cathode follower stage CF60. Means are provided for periodically resetting the condenser memory circuits to a predetermined datum state by a reset pulse input over lead 61. The strobe pulses on lead 62 are derived through inverter N62 from gates G68, G67 while the reset pulses on lead 61 are derived through inverter N61 from gate G66 or the E4 waveform.

Referring now to Fig. 6*c* which shows, in greater detail, the circuit arrangements of the delay elements DL61*a* and DL65 and their associated memory circuits CM61, CM65 and gate circuits CG61 and CG65, it will be seen that the input point *si* to the element DL61*a* is connected to the control grids of each of two cathode follower thermionic valves V30 and V31. The cathode output terminal of the valve V30 is connected to the input end of the inductive element of the 8 microsecond delay line DL61*a* which is of the type previously referred to, whereas the capacitive element of such device is connected to the cathode output of the second cathode follower stage V31. The output end of the delay line DL61*a* is terminated by a suitable load resistor R30 and the inductive element is connected to the control grid of an amplifier valve V32 forming amplifier A2 of Fig. 6*b*. The anode of valve V32 is D.C. coupled by way of the network of resistors R31, R32 and clamping diode D30 to the input point of the next following delay line DL61*b* which is not shown but which is basically similar. The remaining delay lines are of similar form and only the last, i.e. the one microsecond delay line DL65, is shown in the interest of simplicity.

The condenser memory device CM61 comprises a cathode follower valve V33 whose cathode output point is connected by way of lead 63 to the capacitive electrode of the delay line device and whose control grid is connected to one electrode of a condenser C30 whose opposite electrode is earthed. Said control grid is also connected through diode D31 and lead 61 to the source of positive-going reset pulses and by way of diode D32 to the anode of amplifier valve V34 whose control grid is supplied with signals from the associated gate circuit G61. Diode D33 operates as a clamp diode to prevent the control grid of valve V33 rising above earth potential.

The gate circuit CG61 comprises three diodes D34, D35, D36 each having their anodes interconnected and joined by way of resistor R34 to a source of positive potential +100 v. The cathode of diode D36 is connected to lead 62 carrying a strobe pulse waveform comprising a positive-going square pulse timed to coincide with the instant that the time delay value of the variable delay line device is required to be adjusted. The diode D35 is supplied with the wavefrom Z5 derived from the Z counter ZCR already referred to, whereas the other diode D34 is connected to the output terminal 65 of the delay line element DL66 of the multi-section delay line to which the input signals are supplied from the control input terminal $a1^{xx}$ through cathode follower CF.

The remaining control arrangements for each of the different delay line devices DL2 and DL5*b* are substantially identical, the diode D34 of each of the gate circuits CG62 . . . CG65 being connected to a different point 65 along the delay line of DL66 . . . DL70.

The operation of the arrangements of Fig. 6*c* is briefly as follows. If valve V33 of the condenser memory circuit CM61 is fully conductive, the potential of its cathode (substantially earth) will be applied to the capacitive electrode of each of the associated delay line devices DL61*a*, DL61*b* and any negative-going signal input pulses at the input terminal *si* will be ineffective on valve V31 in each device although they will be transmitted through valve V30 to the inductive element only of the associated delay line. Under such conditions the delay line DL61*a* will operate to provide an output similar to that at the input terminal *si* but delayed by a time interval of 8 microseconds and the delay line DL61*b* similarly but with a further delay of 8 microseconds. If, on the other hand, the control grid of valve V33 is driven negative, its cathode current will be cut-off and the cathode of valve V31 in each delay device will be free to respond to the fluctuations occurring in the signal input at terminal *si* whereby both the inductive and capacitive elements of the delay line are supplied with similar signals and no delay action will be provided.

The normal or reset state of the condenser memory circuit CM61 is when condenser C30 is discharged by the positive reset pulse on lead 61. Valve V33 is then conductive, the capacitive element of each of the delay line devices is clamped at earth potential and the delay lines are accordingly operative. If, however, a positive voltage pulse is applied to the control grid of valve V34, the corresponding negative voltage at the anode of that valve will be applied through diode D32 to charge condenser C30 negatively and thereby to cut-off the valve V33 until the arrival of the next reset pulse on lead 61. The associated delay line devices are now rendered inoperative.

Such a positive voltage pulse, i.e. the strobe pulse on lead 62, is supplied through gate circuit CG61 when the Z5 waveform applied to the diode D35 is at its raised earth potential level and when the connection point of the diode D34 to the delay line section DL14 is also at earth potential or above. When the control is being exercised by means of the Z waveform inputs from the Z counter ZCR, Fig. 1*c*, the multi-section delay line of devices DL66 . . . DL70 is without signals and its potential throughout is raised. Under these conditions the state of the Z waveform input, i.e. the Z5 waveform in the case of the sections being considered, determines whether or not the delay line devices DL61*a*, DL61*b* are to be operative or not. If the Z5 waveform is negative, no positive pulse will be applied to valve V34, valve V33 will remain conductive, the cathodes of valves V31 in each device will be held at approximately earth potential and the capacitive element of the delay lines DL61*a*, DL61*b* correspondingly clamped and the delay line devices will thus be operative. If the Z5 waveform is raised in potential to earth or above, the positive pulse on lead 22 will be transmitted to valve V34, valve V33 will be cut-off and will remain cut-off until the next pulse and the delay line devices DL61*a*, DL61*b* will accordingly be rendered inoperative as their capacitive electrodes will be free to fluctuate in potential in phase with the signal voltages applied to the inductive element of the line. In the opposite case where control is by the pulse train input through terminal $a1^{xx}$, the various waveforms Z1 . . . Z5 are always at their normal resting level of earth potential. Under these conditions the existence of a negative pulse voltage at connection point 65 of the delay line DL66 . . . DL70 occurring at the instant of the strobe pulse on lead 62 will prevent such strobe pulse from becoming effective on valve V34 of the related memory circuit CM61 . . . CM65 and the associated valve V33 will remain conductive. As a result of this the associated delay line device will be operative. Conversely, the absence of such a negative pulse at a connection point 65 of the delay line DL66 . . . DL70 at the instant of the strobe pulse on lead 62 will allow the transmission of the positive strobe pulse to the valve V34 in the related condenser memory circuit with the consequential cutting-off of valve V33 whereby the capacitive electrode of the associated delay line element can fluctuate in sympathy with the input voltages applied to the inductive element and the delay line device will be rendered inoperative.

Thus, according to the form of the different waveform outputs of the Z counter Z1 . . . Z5 so the variable delay line device VDC may be set to provide any desired value of delay time between 2 and 33 microseconds in unit steps of 1 microsecond. Thus, if the Z1 and Z3 outputs are each negative and the remaining Z2, Z4 and Z5 outputs are positive-going, only the delay line elements DL63 and DL65 will be operative, providing delay times of 1 and 4 microseconds respectively, and the total delay time will be 5 microseconds. Alternatively, when the Z waveforms are all at positive-going level the transmission of a suitably timed pulse train to terminal $a1^{xx}$ will result in the provision at the connection points 65 of such line an equivalent pattern of control voltages to the gates CG61 . . . CG65 to produce a corresponding setting of the delay line device.

In order to prevent any spurious output signals being supplied from the output terminal 133 (Fig. 6*b*) due to transients fed into the delay line elements as the delay time value is being changed or set up, means are provided such as leads 60 by which a flow of signals into the delay line may be inhibited by the Clamp waveform, Figs. 2*a*, 2*b*. This waveform operates to block either the amplifier or pulse shaper circuit to which it is applied. If the clamping points are separated in time by not more than 8 microseconds then it is necessary only to effect clamping for 8 microseconds subsequent to the instant of adjustment to ensure elimination of all spurious outputs.

*Operation of accumulator*

A description of the manner of operation of the accumulator arrangements shown will now be given, with the aid of the timing diagrams of Figs. 7–13.

The first step in any operation is to extract a 40-digit number $x2^y$ from the main store of the machine and register it in appropriate places in the accumulator.

Each 40-digit number is assumed located in four consecutive single word address $s$, $s+1$, $s+2$ and $s+3$ of the main store MS, Fig. 1*f*. The 10-digit exponent portion $y$ is located in address $s$ and the three portions $x1$, $x2$ and $x3$ of the 30-digit number portion (which is in "standard" form as previously defined), given in order of increasing significance, are located in address positions $s+2$, $s+1$ and $s+3$.

Extraction of each of these four 10-digit words is effected in the manner described in the aforesaid reference A in consequence of an appropriate instruction in the control system CL. As shown in Fig. 7, the first portion *y* appears in serial form on input lead 100 in beat S4 of the bar following the initial prepulse and this is routed by way of gate G1 to input bus bar A, Fig. 1*b*. This *y* portion then passes through complementer CM1, Fig. 1*c*, rendered inoperative to effect complementing at this time, then through gate G2 to input *a4* of the computing unit CMU, which, as it is not being supplied with any input on its opposite input terminal *b4*, provides an unaltered output signal at its output *f5*, which signal passes through gate G7 and the further delay DL33 to the output busbar O arriving at the latter exactly 20 microseconds later. From the output busbar O such *y* portion passes in beat S5 either (in the case of order 24 namely *s*, A) through gate G18 to the input terminal 108 of the 10-digit register YA, Fig. 1*d*, where it commences to circulate and becomes available at the output terminal 109 of such register during beat A5 and every consecutive beat thereafter or alternatively (in the case of order 25 *s*, D) through gate G35 to input terminal 123 of the YD register, Fig. 1*b*, where it is similarly received and becomes available during beat A5 and every subsequent beat thereafter.

The subsequent portions *x2*, *x1* and *x3* become available in that order in similar manner at input lead 100 in beats S5, S6 and S7 respectively. The first portion *x2*, appearing in beat S5, is fed by way of gate G32 and lead 113 to the input terminal 146 of the 30-digit register XR, Fig. 1*b*, where it commences to circulate and will appear again at the output terminal 147, 30 microseconds later, i.e. during beat A6. The next portion *x1*, appearing in beat S6, is similarly fed through gate G32 and lead 113 to the XR register where it is inserted, effectively, in front of the previously inserted portion *x2* and commences to circulate to appear again at the output terminal of the register in beat A7 and every 30 microseconds thereafter. The third portion *x3* is likewise fed during beat S7 through gate G32 and lead 113 to the XR register where it is inserted and commences to circulate in a position which is immediately behind the first inserted portion *x2*. The three 10-digit portions of the number are thus now located in the register XR in the correct order and become available at the output terminal 147 of such register once in every 30 microseconds commencing with the initial insert time of the *x1* portion, namely, the three beat period S6, A6 and S7. It will be understood that this particular method and order of inserting the three 10-digit portions is occasioned by the nature of the related cathode ray tube main data store MS which can deliver serial form number portions only during alternate beats. If, however, the store is one capable of providing a 30-digit number in consecutive form, such a number could be inserted in one simple step in straightforward manner.

The sign digit, i.e. the last digit of the portion *x3*, is first available for testing during beat A6 in which it is delivered in parallel form from the related cathode ray tube of main store as described in the aforesaid copending application and the read output from this store on lead 174 (Figs. 1*b* and 1*f*) is strobed at this time for all long number arithmetic and the sign of the read-out number is stored on a sign staticisor constituted by trigger circuit FF5, Fig. 1*b*, by way of gate G62.

In the case of order 24—namely *s*, A, the assembled 30-digit number signal is fed in beats A7, S8 and A8 to the register XA, Fig. 1*d*, by way of gate G26, lead 148 and gate G49 to input terminal 104 of register XA where it is registered and commences to circulate.

In the case of order 25—namely *s*, D, the assembled 30-digit number signal is fed in the same beats A7, S8 and A8 to the register XD, Fig. 1*b*, by way of gate G26, complementer CM2 and gate G34, being complemented on the way through complementer CM2 if the Sign staticisor trigger circuit FF5 has, in the meantime, been triggered in consequence of the examination of the sign digit of the number portion *x3* as referred to above.

The case of addition or subtraction of a second number to or from that previously registered as described above in the XR and YA registers will next be considered. The relevant orders are 16—*a*+*s*, A with round off; 17—*a*—*s*, A with round off; 18—*a*+*s*, A without round off and 19—*a*—*s*, A without round off.

As indicated in Fig. 8, during beat S3 of the bar concerned *y*A (i.e. the exponent-representing first portion *y* of the first number) is fed from the YA register, Fig. 1*d*, through gate G19 to busbar B while a zero signal occurs on busbar A. The input signal on busbar B passes by way of lead 147 and the delay line DL22, Fig. 1*b*, to input terminal *b4* of the computing unit CMU while, as there is a zero signal on busbar A, there is no signal at the input *a4* of such computing unit. The resultant output at terminal *f5* is therefore *y*A unaltered and this arrives at busbar O during beat S4.

Output busbar O is connected to input busbar B by way of gate G21 in beat S4 so that *y*A is circulated back to such input busbar B for transmission again through lead 147 and the delay line DL22 to the terminal *b4* of the computing unit CMU. Simultaneously the exponent portion *y*S (i.e. the exponent-representing first portion *y* of the second number) appears as an output from the main store on the input lead 100 and passes to busbar A through gate G1 and thence to complementer CM1. The complementer CM1 is now rendered operative so that the complement of *y*S (C*y*S) is available at output point *a1* and is fed by way of gate G2 and delay line DL3 to input terminal *a4* of the computing unit CMU. The output from terminal *f5* of the computing unit is accordingly *y*A—*y*S, i.e., δ. The sign of this signal δ is then determined by transmission through inverter circuit N1 simultaneously fed with the INV P4 waveform to examine the last significant digit position of the δ signal. If an output pulse is delivered from the inverter N1 it is indicative of positive sign and this pulse is applied through gate G10 to trigger the Exponent Test staticisor constituted by trigger circuit FF2. Thus if δ is positive the output ⩾ of trigger circuit FF2 goes negative, and the previously negative < output goes positive. If δ is negative then the state of trigger circuit FF2 remains unaltered.

The δ signal is also fed through the delay line DL33 to the output busbar O which it reaches during beat S5 and is then recirculated to the input busbar A by way of gate G48 and thence by way of the complementer CM1 which is rendered either operative or inoperative during this beat under the control of the output from the trigger circuit FF2 so that the output from this complementer available at point *a1* represent the modulus of /δ/.

This output representing the modulus of /δ/ is fed by way of lead 170, gate G70 and inverter N7 to the delay line network of DL74, DL73 . . . DL70 where the 5 least significant digits of the number signal are examined by the action of the P6 pulse in the S5 beat fed at gate G68, Fig. 6*b*, to set up, through the variable delay control circuit CVDC, the variable delay circuit VDC with a delay value according to "not" /δ/. Thus, if the difference between the first exponent-representing number *y*A and the second exponent-representing number *y*S is 00011 indicating that the time position of the binary point of the number represented by *x*S·*y*S is three places to the right with respect to that of the number represented by *x*A·*y*A, the modulus /δ/ signal 00011 on lead 132 is converted into 11100 in the delay line network of the circuit CVDC and serves to put the 4, 8 and 16 microsecond delay elements of the variable delay circuit VDC into operation while leaving the 1 and 2 microsecond delay elements inoperative. When, as will be described later, the *x*S number-representing signal is routed through such variable delay circuit while the $xA$ number-representing signal is fed direct to the computing unit CMU, the $xS$ signal will be subjected to an inherent delay of 2 microseconds plus an adjusted delay of 28 microseconds, i.e. a total of 30 microseconds, see Fig. 9. As the $xA$ signal is transmitted in a 30 microsecond time period immediately following that in which the $xS$ signal is transmitted and over a path which includes 3 microseconds delay, the two signals will subsequently arrive at the computing unit CMU with correct place alignment of their respective digit signals.

Immediately after the above described setting of the variable delay circuit VDC by the 5 least significant digits, the following 5 most significant digits of the "not" $/\delta/$ signal are fed by way of the further inverter circuit N8 to gate G71 where any "1" digit pulse in such signal will operate as a triggering input to the trigger circuit FF7. Any "1" digit in the 5 most significant positions of the original modulus $/\delta/$ signal on lead 132 is indicative that the difference between the two exponent-representing numbers is greater than 31 and hence is incapable of correction by the variable delay circuit VDC and is out of range of the arithmetic unit. Due to the passage of such signal through the two inverter circuits N7 and N8 any "1" digit signal applied to the gate G71 accordingly indicates a similar out of range condition and the output of the trigger circuit FF7 is thereafter used as a means of eliminating the lesser number, the greater number being taken as the correct answer.

If $\delta$ is negative, indicated by the non-triggering of trigger circuit FF2, gates G2 and G5 remain open and gates G3 and G4 remain closed. The modulus $/\delta/$ signal at point $a1$ in beat S5 accordingly passes through gate G2 to input $a4$ of the computing unit CMU while the exponent portion $yA$ passes from the YA register through gate G19 and busbar B to lead 147 and thus through delay DL22 to the input terminal $b4$ of the computing unit. A "1" digit is inserted into the least significant position of the answer signal by release of the P4 pulse through gate G60, Fig. 5, so that the output at terminal $f5$ of the computing unit CMU represents $yA+\delta+1$ and this is fed in beat S6 from busbar O through gate G18 into the YA register, the previous stored $yA$ number signal being erased by simultaneous closure of gate G17. As, in this case $/\delta/=-(yA-yS)$, the resultant exponent number recorded in the YA register is equal to $yS+1$.

In the case where $\delta$ is positive, the trigger circuit FF2 is triggered and the gates G3 and G4 are opened whereas gates G2 and G5 are closed. In these circumstances the modulus $/\delta/$ signal is fed to the variable delay circuit VDC which is, however, clamped at this time so that this modulus $/\delta/$ signal is lost. The $yA$ signal is, as before, fed through gate G19, input busbar B and lead 147 to the input terminal $b4$ of the computing unit CMU and after the insertion of a "1" digit as previously described, appears at output terminal $f5$ as a signal representing $yA+1$. This is fed, as in the previous case, to busbar O and thence by way of gate G18 into the YA register in replacement of the previous stored $yA$ signal.

The purpose of the addition of $+1$ in each case is to effect an automatic correction necessitated by the subsequent use of the Z counter ZCR to effect correction of the answer exponent when the $x$ portion of the answer number signal has been standardised.

The arithmetic operations concerned with the exponent portions is now completed and those concerned with the number portions commence.

In the early part of the bar involved in any of the aforesaid orders 16, 17, 18 or 19 the second number $xS$ has been read out from the main store MS, Fig. 1$f$, and assembled in correct order of its three 10-digit portions in the XR register in a manner identical with that already described in connection with the orders 24, 25.

The 30-digit first number $xA$ has, as already described, been assembled in the XA register and the earliest time at which it is available is the period defined by the T1 waveform, namely, beats S6, A6 and S7. The gates G2 . . . G5 have already been set in accordance with the sign of $\delta$ in beat A4 and the variable delay circuit VDC at the digit time P6 in beat S5.

Assuming that $\delta$ is positive indicating that the $xA$ number registered in the XA register is equal to or greater than the $xS$ number now registered in the XR register, the trigger circuit FF2 has, as already described, been triggered and gates G3, G4 are open and gates G2, G5 are closed.

Figures 9, 10, 11:
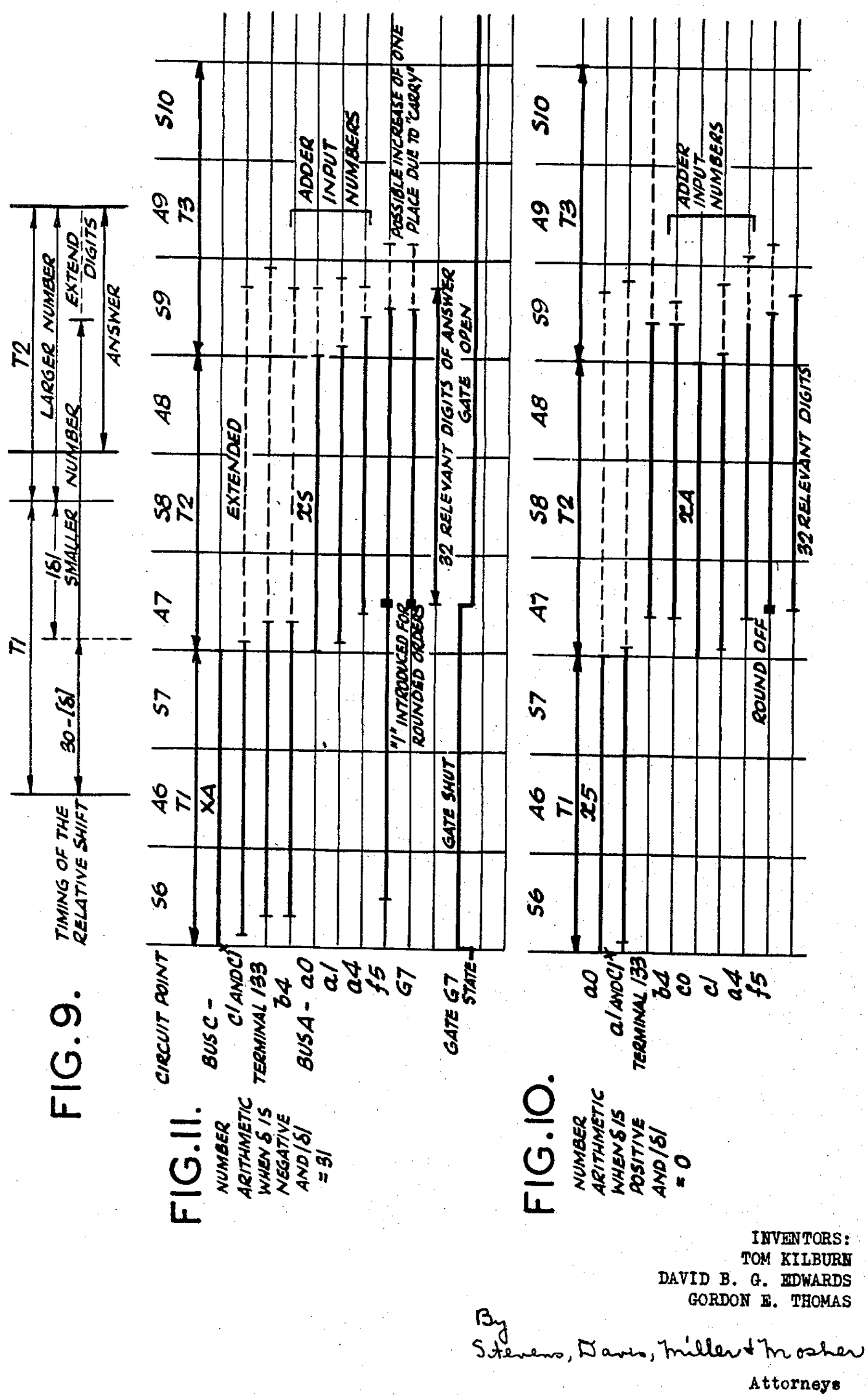

Referring now to Fig. 10, in the T1 period (beats S6, A7 and S7 for orders 16 . . . 19), gate G31, Fig. 1$b$, is opened to allow passage of the $xS$ number from the XR register by way of busbar A, complementer CM1, gate G3, variable delay circuit VDC and gate G6 to terminal $b4$ of the computing unit CMU. The length of this number is automatically extended by copying of its most significant digit due to the action of the input through gate G76 and gate G77 to busbar A. The complementer CM1 is operative to effect complementing for subtract orders 17 and 19 but is inoperative for add orders 16 and 18.

In the following T2 (beats A7, S8 and A8) the $xA$ number in the XA register is fed through gate G16, busbar C, delay line DL2 of extender EXC, gate G4 and delay line DL3 to the input terminal $a4$ of the computing unit CMU. By reason of the delay imposed on the $xS$ number by the variable delay circuit VDC this will arrive at the computing unit CMU in correct place registration with the $xA$ number from the XA register. The two numbers are now added and the resultant output signal appears 1 microsecond later through output terminal $f5$. If round off is required a "1" digit is inserted through gate G80 feeding into the output circuit of the composite computing unit CMU at the appropriate instant, i.e. by the negative-going edge of the T′ waveform.

As the answer number (now of extended digit length) emerges from terminal $f5$ it proceeds to busbar O by way of gate G7 and the delay line DL33 and then passes by way of delay line DL6 and gate G14 into the XA register which, at this time, acts simply as a 30 microsecond delaying medium.

Figures 12, 13:
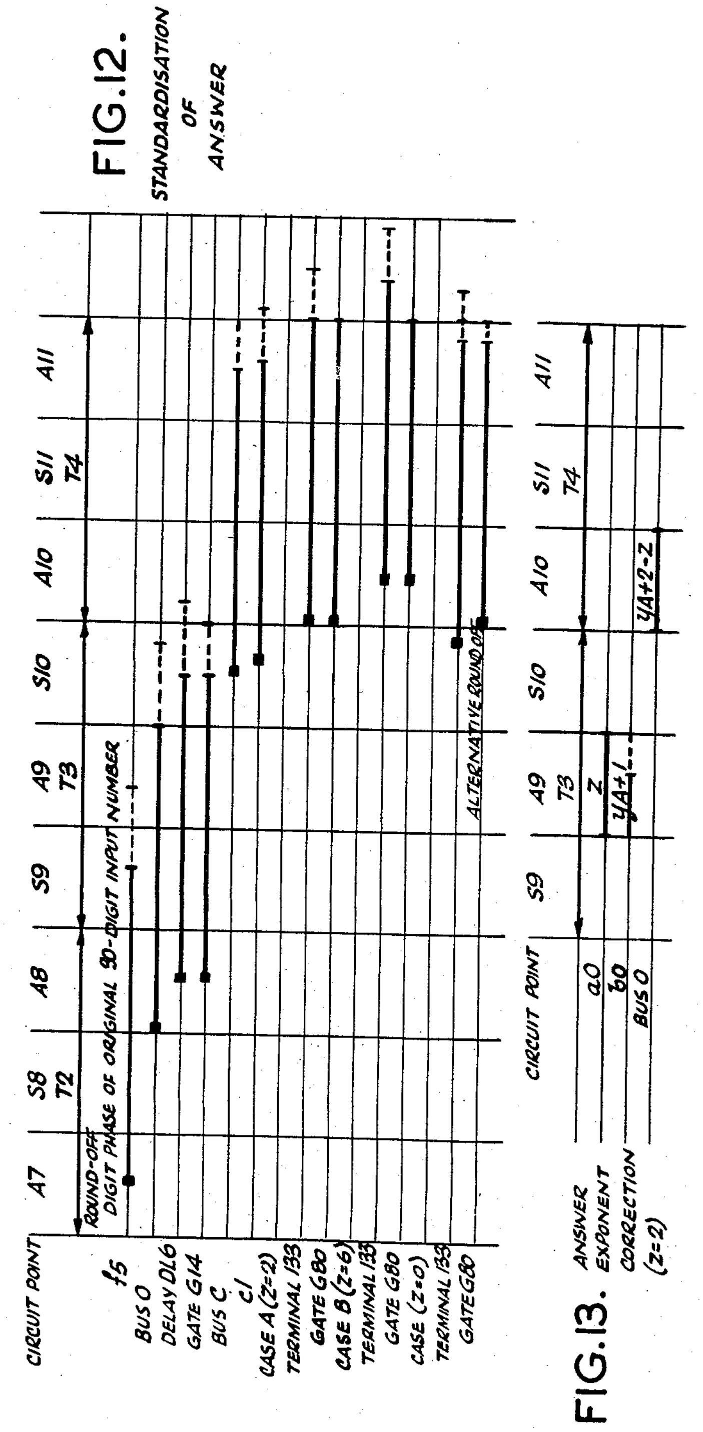

Simultaneously the same answer signal is fed over lead 102 to the input terminal 134 of the Z counter circuit ZCR. As already explained the Z counter circuit effectively provides a series of decreasing value counts from 31 down to 0 during the 32 digit intervals following the arrival of the first digit of the answer number and a reading is taken of this count state every time when there is a change-over of digit values in the answer signal. The last obtained reading is therefore indicative of the position of the last change-over point and hence is indicative of the necessity or otherwise of effecting a subsequent standardising operation and of the degree of shift required to effect such standardisation. Fig. 12 indicates the timing during a standardising operation.

If the answer number is already correctly standardised, its last change-over of digit values will be between the 29th and 30th digits from the least significant or leading end and the Z counter ZCR will record 2. In consequence the appropriate Z waveform output obtainable from such Z counter will operate to set the variable delay circuit VDC to 2 microseconds of variable delay which, coupled with its inherent delay of 2 microseconds, will provide a total of 4 microseconds delay in such circuit. Subsequently when the same answer signal is read out from the XA register it passes by way of gate G16 to busbar C and thence through the delay line DL2 of extender EXC, and gate G5 to such variable delay circuit VDC whereafter it passes by way of gate G80 to the input terminal 104 of the XA register once again where, by virtue of the various fixed value delay line elements and the variable delay inserted by the circuit VDC coupled with the gating action of the T4 waveform in gate G80 the 30 digit block comprising the 29 digits up to the aforesaid last change-over point and the next opposite value digit of the previous extended length signal train are alone recorded.

If the answer signal was not of standard form it could be one in which a right shift of up to 2 places was necessary (this is the maximum amount of right shift possible) in which case the Z counter reading would be zero or, alternatively, the required shift could be any number of places to the left (a total of 29 is the maximum possible) in which case the Z counter reading could be any number from 2 to 29. In either case the operation of the Z counter upon the variable delay circuit VDC is the same.

Referring now to Fig. 11, in the case where $\delta$ is negative the gates G 2 and G5 will be open and gates G3 and G4 closed at the commencement of the number arithmetic operation. In this case, where the $x$A number is smaller than the $x$S number, gate G16 is opened in the T1 period to allow the $x$A number to pass by way of busbar C, delay line DL2 of extender EXC and gate G5 to the variable delay circuit VDC and thence by way of gate G6 to the input terminal $b4$ of the composite computing unit CMU. The sign of the last digit of this $x$A number is examined by the gate G74 of the extender EXC with its controls whereby the form of this last digit is copied continuously throughout the following 30 digits of the T2 period. In the T2 period gate G31 is opened to allow the $x$S number held in the XR register to pass by way of busbar A to complementer CM1 (which is either operative or not operative according to the nature of the order) and thence to gate G2 and delay line DL3 and so to input terminal $a4$ of the composite computing unit CMU. From this point onwards the operation is substantially as already described with relation to a $\delta$ of positive value.

In each of the above cases it has been assumed that $\delta$ is less than 31. If $\delta$ is greater than 31 there is no point in doing the arithmetic and in these circumstances gate G6 is shut by the output from trigger circuit FF7 to prevent the passage of the lesser number to the computing unit, the greater number alone being passed through the computing unit CMU without change as the correct answer number.

All that remains now is to effect any necessary correction of the exponent number (e.g. $yA+1$) at present recorded in the YA register consequent upon any shift imposed during the standardisation operation. This is effected by serialising the setting state of the Z counter ZCR at the end of beat S9 and feeding it in beat A9 from terminal 135 by way of lead 137 to input busbar A where it passes to the complementer CM1 which is now rendered operative. The complement of $z$, i.e. C$z$, accordingly appears at point $a1$ and passes to input terminal $a4$ of the computing unit CMU. Simultaneously the exponent number in the YA register is fed by way of busbar B and lead 147 to terminal $b4$ of the computing unit CMU while in such computing unit a "1" digit is added at the least significant position. Thus, for example in the case where the answer number was already of standard form and the resultant Z counter state one of value 2, the eventual answer number at the output terminal $f5$ of the computing unit CMU becomes $yA+1-2+1$ or $y$A unaltered. Similarly with other values of $z$. Fig. 13 indicates the timing during answer exponent correction.

The manner of operation under other forms of order (for example, in conjunction with the multiplier M where three exponents $y$A, $y$D and $y$R are handled and a 30-digit product is added to the 30-digit $x$A number) while different in detail and timing, follows the same general lines to those outlined above.

While the invention has been more particularly described in its application to a "floating point" binary computing machine operating with number-representing signals in serial pulse train form, it will be clear that the same general principles may readily be adapted to machines operating with numbers having a different radix and/or with parallel form signals. In the latter case the variable delay device VDC would be replaced by a variable shift device by which the various input signal channels can be connected to any chosen group of sequential output channels.

We claim:

1. An electronic digital computing machine arranged to effect computing operations with a "floating" radix point with numbers represented in the serial mode as electric pulse signal trains, each of which pulse signal trains consists of an exponent-representing first portion and a number-representing second portion, which machine comprises means for effecting an initial subtraction operation with the exponent-representing first portions of two separate number-representing signals which are to be the subject of a computing operation and for deriving therefrom an exponent difference signal which is representative of the difference in exponent value of the two numbers, means for using said derived exponent difference signal to control the setting of a variable signal delay means whose time delay value is controllable by said applied exponent difference signal, means for using said derived exponent difference signal to provide a sign-representing signal indicative of which of the two exponent-representing first signal portions is the greater and means for using said derived sign-representing signal to control the respective routings of the number-representing second signal portions of the two separate number signals to a computing circuit by way of separate signal channels, one of which channels includes said variable signal delay means whereby said two number-representing second signal portions are presented to said computing circuit with respective timings appropriate to correct place registration of the radix points thereof.

2. An electronic digital computing machine according to claim 1 which includes means for registering that one of said exponent-representing first signal portions which is of greater value for use as the exponent-representing first signal portion of the eventual answer signal.

3. An electronic digital computing machine according to claim 2 which includes means for examining and standardising the number-representing section portion of the eventual answer signal and means for re-adjusting said registered exponent-representing first portion of the answer signal in accordance with any change of significance of the number-representing second portion of the answer signal effected by said standardising means.

4. An electronic digital computing machine according to claim 1 in which said variable signal delay means comprises a multi-section electric delay line whose respective sections are arranged to have delay times of 1, 2, 4, 8 . . . digit intervals of said pulse signal trains and means for selectively rendering each section operative or inoperative in accordance with the examined value of a related binary digit of said controlling exponent difference signal.

5. An electronic digital computing machine according to claim 4 wherein each of said delay line sections comprises an electric delay line of the inductive/capacitive type and in which each of said delay lines is arranged to be rendered operative or inoperative by clamping or unclamping the capacitive element thereof to or from a source of fixed potential.

6. An electronic digital computing machine according to claim 5 which includes a data storage means of the cathode ray tube type operating with a rhythm of alternate scan and action beats, in which said exponent-representing first signal portion is of one word length and in which said number-representing second signal portion is an odd multiple number of word length parts and which includes means for rearranging the order of the separate word-length parts of said number-representing second signal portions read out from said data storage means to form a continuous multi-word length signal occupying sonsecutive beats of said machine rhythm.

7. An electronic digital computing machine arranged to effect "floating" radix point computing operations with number-representing signals in the serial mode each of which number-representing signals comprises two separate portions each of electric pulse signal train form and consisting of an exponent-representing first portion and a number-representing second portion, such machine comprising first and second number signal inputs for providing first and second number-representing signals, a computing circuit including means for effecting a subtraction operation therewith, said computing circuit having first and second inputs and a signal output, circuit means for connecting said first and second number signal inputs to said first and second inputs of said computing circuit, said circuit means including a signal-controlled transposing network for connecting said first number signal input to said first computing circuit input and said second number signal input to said second computing circuit input or for connecting said first number signal input to said second computing circuit input and said second number signal input to said first computing circuit input, said circuit means also including signal-controlled branch circuit means including a signal-controlled variable signal delay device connected between said transposing network and said second computing circuit input, sign testing means connected to said output of said computing circuit, said sign testing means providing an output controlling signal for controlling said transposing network, controlled circuit means connecting said computing circuit output to control said variable signal delay device and control means for directing said first portions of first and second number-representing signals available simultaneously at said first and second number inputs to said computing circuit to effect subtraction therebetween and for directing the resultant difference signal output of said computing circuit to said sign testing means and said signal controlled variable delay device to adjust said transposing network and said variable signal delay device whereby the second portions of said first and second number-representing signals simultaneously available at said first and second number signal inputs are fed to said computing circuit with correct place registration of the radix points thereof.

8. An electronic digital computing machine according to claim 7 which includes means for registering that one of the two exponent-representing first signal portions which is of greater value as the exponent-representing signal portion of the eventual answer signal.

9. An electronic digital computing machine according to claim 8 which includes a signal register for storing an exponent-representing first portion of a number signal, said register having an input and an output, controlled circuit means connecting said first number signal input to said input of said register for initially registering said first portion of said first number signal and second controlled circuit means connecting said input of said register to said second number signal input for recording said first portion of said second number-representing signal, said circuit means being controlled by said output from said sign testing means to effect replacement of the registered first portion of the first number-representing signal by the first portion of the second number-representing signal when said output from said computing circuit indicates that the value of said first portion of said second number signal is greater than said first portion of said first number signal.

10. An electronic digital computing machine according to claim 9 which includes means for examining and standardising the number-representing second portion of the eventual answer signal output from said computing circuit and means for re-adjusting the value of said registered exponent-representing first portion of the answer signal in accordance with any change of significance of the number-representing second portion of said answer signal effected by said standardising means.

11. An electronic digital computing machine according to claim 10 in which said examining and standardising means comprises a digit signal selection and comparison device for detecting the last occurring changeover of successive digit signal values in said answer-representing second signal portion, said means providing an output signal controlling said variable signal delay means in accordance with the position of said detected last value changeover and controlled circuit means for passing said number-representing second portion of the answer signal through said variable delay means to bring said answer-representing second signal portion to standardised form.

12. An electronic digital computing machine according to claim 11 in which said means for re-adjusting the value of said registered exponent-representing first portion of the answer signal comprises controlled circuit means for passing said exponent-representing first portion of said answer signal registered in said register through said variable delay means after control by said output signal from said signal selecting and examining means.

13. An electronic digital computing machine according to claim 7 in which said variable signal delay means comprises a multi-section electric delay line whose respective delay sections are arranged to have delay times of 1, 2, 4, 8 . . . digit intervals of said pulse train signals and associated control means for each of said delay line sections each arranged to render the related delay line section operative or inoperative in accordance with the examined value of a related different binary digit signal of said exponent difference signal supplied thereto from said computing circuit output.

14. An electronic digital computing machine according to claim 13 wherein each of said delay line sections comprises an electric delay line of the inductive/capacitive type and in which said delay line is arranged to be rendered operative or inoperative to effect delay by clamping or unclamping capacitive elements thereof to or from a source of fixed potential.

References Cited in the file of this patent

UNITED STATES PATENTS

| | | |
|---|---|---|
| 2,538,636 | Williams | Jan. 16, 1951 |
| 2,781,446 | Eckert et al. | Feb. 12, 1957 |
| 2,800,278 | Thomas | July 23, 1957 |

FOREIGN PATENTS

| | | |
|---|---|---|
| 724,137 | Great Britain | Feb. 16, 1955 |
| 745,833 | Great Britain | Mar. 7, 1956 |

OTHER REFERENCES

Description of Relay Calculator—Annals of the Computation Lab. of Harvard Univ., volume XXIV, Harvard Univ. Press, pages 67 to 87.